US012135611B2

(12) United States Patent
Tseng et al.

(10) Patent No.: US 12,135,611 B2
(45) Date of Patent: Nov. 5, 2024

(54) BIOS BACKUP/RECOVERY SYSTEM

(71) Applicant: Dell Products L.P., Round Rock, TX (US)

(72) Inventors: Wei-Chieh Tseng, Taoyuan (TW); Shao-Hsien Tai, New Taipei (TW); Po-Yu Cheng, Tainan (TW); Ying-An Chen, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 19 days.

(21) Appl. No.: 18/185,620

(22) Filed: Mar. 17, 2023

(65) Prior Publication Data

US 2024/0311244 A1    Sep. 19, 2024

(51) Int. Cl.
*G06F 11/07* (2006.01)
*G06F 11/14* (2006.01)
*G06F 13/42* (2006.01)

(52) U.S. Cl.
CPC ...... *G06F 11/1417* (2013.01); *G06F 13/4282* (2013.01); *G06F 2201/805* (2013.01); *G06F 2213/0002* (2013.01)

(58) Field of Classification Search
CPC .............. G06F 11/1417; G06F 2201/805
USPC .......................... 714/15, 21; 713/2
See application file for complete search history.

(56) References Cited

U.S. PATENT DOCUMENTS

| 6,185,696 B1* | 2/2001 | Noll ............. G11C 29/74 714/11 |
| 8,180,735 B2 | 5/2012 | Ansari et al. |
| 2016/0124816 A1* | 5/2016 | Huang ............ G06F 13/4282 714/15 |
| 2022/0374223 A1* | 11/2022 | Huang ............ G06F 9/4401 |

FOREIGN PATENT DOCUMENTS

CN  107463412 A  * 12/2017  ............ G06F 8/65

\* cited by examiner

*Primary Examiner* — Chae M Ko
(74) *Attorney, Agent, or Firm* — Joseph Mencher

(57) ABSTRACT

A BIOS backup/recovery system includes a chassis housing a BIOS backup/recovery subsystem coupled to a primary and a secondary BIOS storage system. The BIOS backup/recovery subsystem begins initialization operations and determines whether the primary BIOS storage system includes customized MAC addresses. If so, the BIOS backup/recovery subsystem determines whether MAC addresses in the secondary BIOS storage system match the customized MAC addresses in the primary BIOS storage system and, if not, performs a BIOS backup operation that includes copying the customized MAC addresses in the primary BIOS storage system to the secondary BIOS storage system. If not, the BIOS backup/recovery subsystem determines whether MAC addresses in the secondary BIOS storage system match default MAC addresses in the primary BIOS storage system and, if not, performs a BIOS recovery operation that includes copying customized MAC addresses in the secondary BIOS storage system to the primary BIOS storage system.

20 Claims, 18 Drawing Sheets

BIOS BACKUP/RECOVERY SYSTEM

BACKGROUND

The present disclosure relates generally to information handling systems, and more particularly to backing up and recovering a BIOS in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and other computing devices known in the art, utilize a Basic Input/Output System (BIOS) to perform hardware initialization during an initialization/boot process (e.g., during Power-On Self-Test (POST) operations) for the server device, to provide runtime services for operating systems and programs/applications provided on the server device, and/or perform other BIOS operations known in the art. In some situations, the BIOS in a server device can become corrupted or may otherwise operate incorrectly and will require BIOS recovery operations to allow that BIOS to again operate correctly. However, conventional BIOS recovery systems suffer from issues that can affect the operation of the server device post-BIOS recovery.

For example, the BIOS in server devices such as those utilizing INTEL® System on Chip (SoC) platforms available from INTEL® corporation of Santa Clara, California, United States, includes a BIOS Read-Only Memory (ROM) having a Network Access Control (NAC) region that is configured to store Media Access Control (MAC) addresses utilized by the BIOS. Furthermore, the MAC addresses stored in the NAC region of the BIOS ROM in the BIOS are initially provided by the BIOS/processor manufacturer as "default" MAC addresses, and one or more of those "default" MAC addresses may be replaced with "customized" MAC addresses by a server device manufacturer that provides the BIOS in the server device. When that BIOS becomes corrupted or otherwise operates incorrectly, conventional BIOS recovery systems operate to erase the BIOS ROM and rewrite uncorrupted BIOS code to the BIOS ROM in order to recover the BIOS in the server device. However, the erasing of the BIOS ROM will erase any "customized" MAC addresses provided in the NAC region of the BIOS ROM, and the recovered BIOS in the server device will include only the "default" MAC addresses, which can prevent the server device from communicating via a network and requires time consuming operations to remedy.

Accordingly, it would be desirable to provide a BIOS recovery system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Basic Input/Output System (BIOS) backup/recovery engine that is configured to: begin initialization operations; determine whether a primary BIOS storage system includes customized Media Access Control (MAC) addresses; and in response to determining that the primary BIOS storage system includes customized MAC addresses, determine whether MAC addresses included in the secondary BIOS storage system match the customized MAC addresses included in the primary BIOS storage system and, if not, perform a BIOS backup operation that includes copying the customized MAC addresses included in the primary BIOS storage system to the secondary BIOS storage system; and in response to determining that the primary BIOS storage system does not include customized MAC addresses, determine whether MAC addresses included in a secondary BIOS storage system match default MAC addresses included in the primary BIOS storage system and, if not, perform a BIOS recovery operation that includes copying customized MAC addresses included in the secondary BIOS storage system to the primary BIOS storage system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
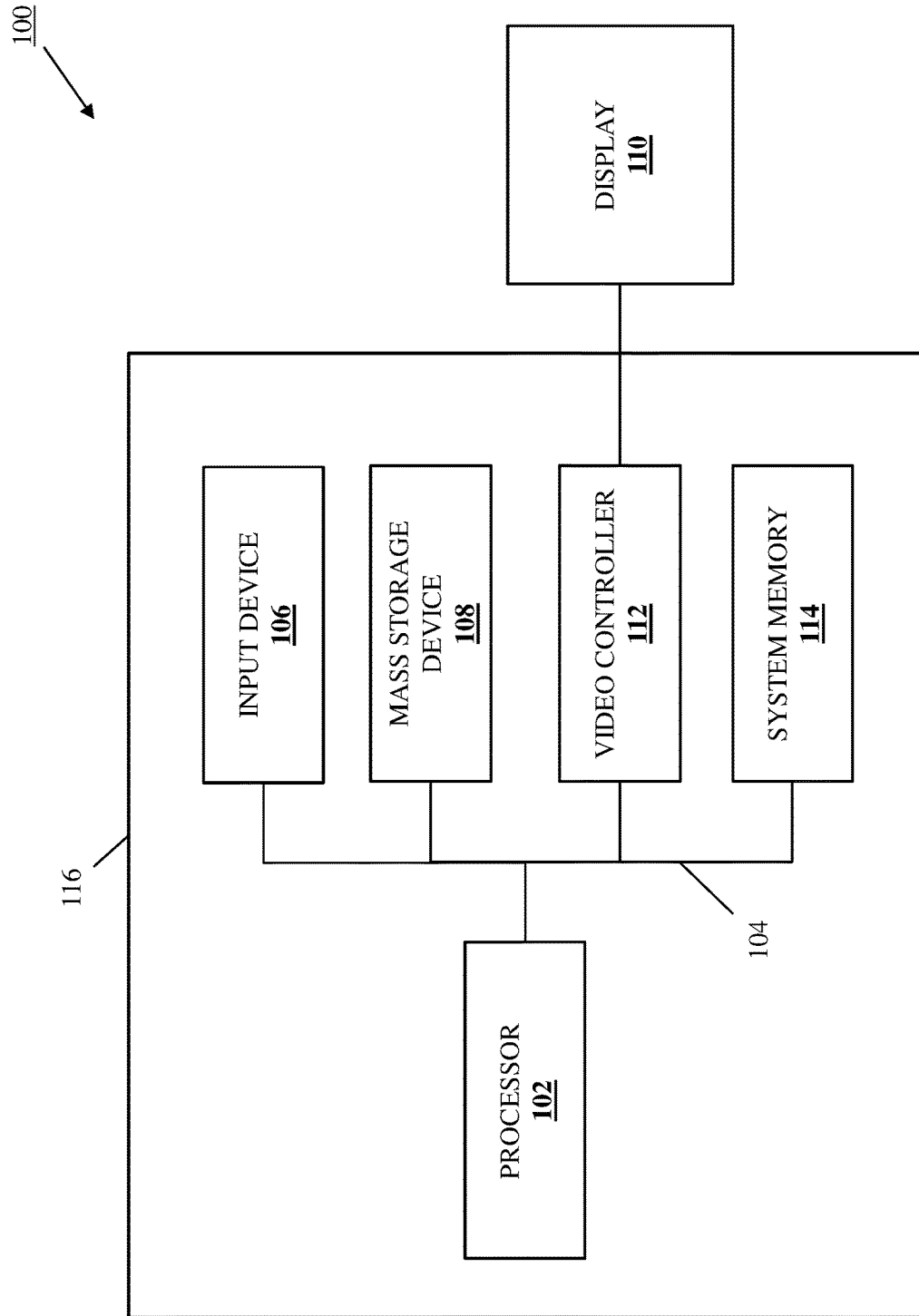
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
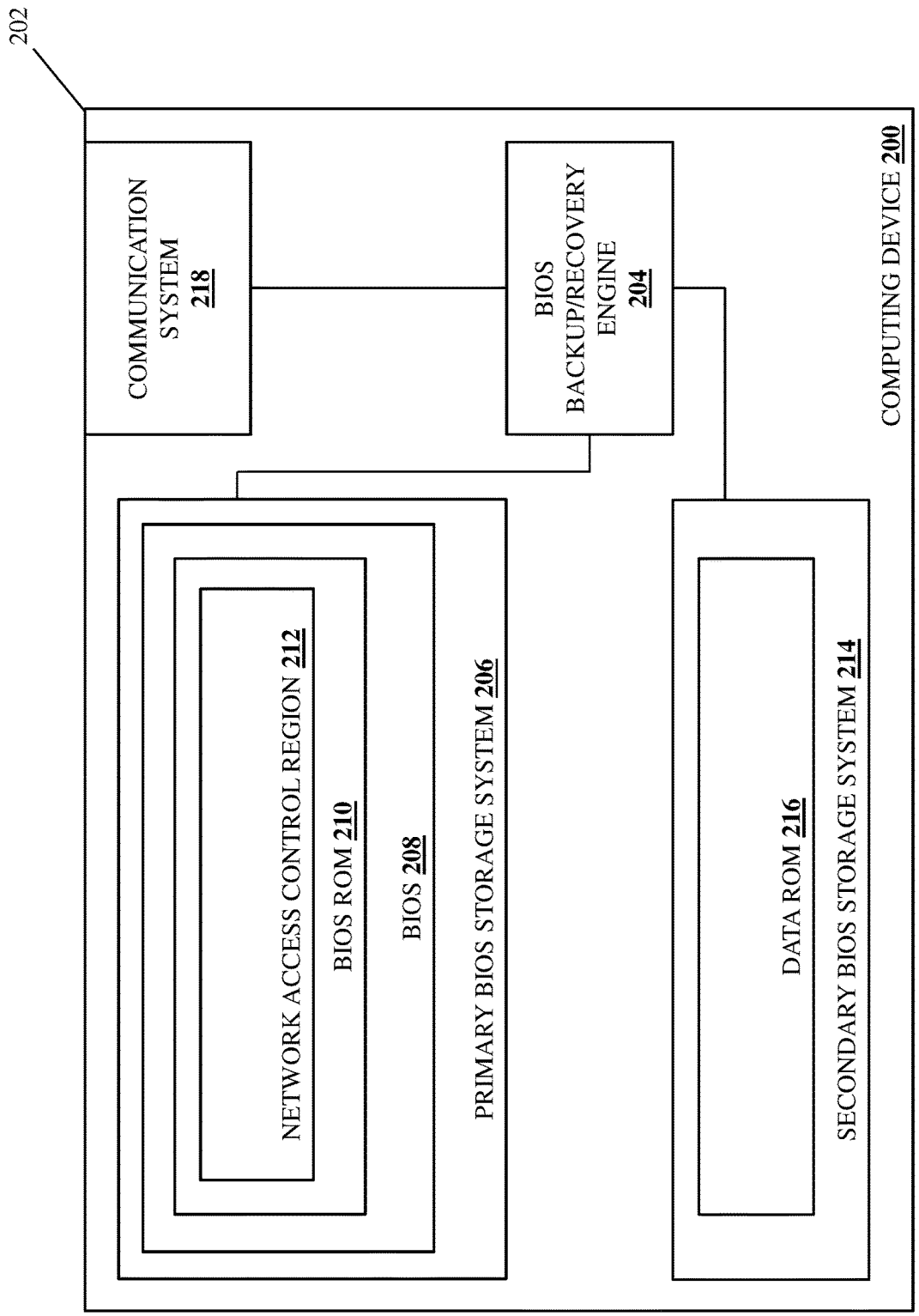
FIG. 2 is a schematic view illustrating an embodiment of a computing device that includes the BIOS backup/recovery system of the present disclosure.

Referring now to FIG. 2, an embodiment of a computing device 200 is illustrated that may include the BIOS backup/recovery system of the present disclosure. In an embodiment, the computing device 200 may be provided by the IHS 100 discussed above with reference to FIG. 1 and/or may include some or all of the components of the IHS 100, and in specific examples may be provided by server devices, desktop computing devices, laptop/notebook computing devices tablet computing devices, mobile phones, networking devices (e.g., switch devices, router devices, etc.), storage systems, and/or other computing devices known in the art. Furthermore, while illustrated and discussed as being provided by particular computing devices, one of skill in the art in possession of the present disclosure will recognize that the functionality of the computing device 200 discussed below may be provided by other devices that are configured to operate similarly as the computing device 200 discussed below.

In the illustrated embodiment, the computing device 200 includes a chassis 202 that houses the components of the computing device 200, only some of which are illustrated and discussed below. For example, the chassis 202 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a BIOS backup/recovery engine 204 that is configured to perform the functionality of the BIOS backup/recovery engines, BIOS backup/recovery subsystems, and/or computing devices discussed below. In a specific example, the processing system that provides the BIOS backup/recovery engine 204 may be provided by a central processing system (e.g., a Central Processing Unit (CPU)) in the computing device 200, as well as by a Serial Peripheral Interface (SPI) controller, although one of skill in the art in possession of the present disclosure will appreciate how they functionality of the BIOS backup/recovery engine 204 may be provided by a variety of hardware and/or software components while remaining within the scope of the present disclosure as well.

The chassis 202 may also house a primary BIOS storage system 206 that is coupled to the BIOS backup/recovery engine 204 (e.g., via a coupling between the primary BIOS storage system 206 and the processing system). In an embodiment, the primary BIOS storage system 206 may be provided by or included on a primary SPI chip, although other primary BIOS storage systems are envisioned as falling within the scope of the present disclosure as well. As illustrated, a BIOS 208 may be included in the primary BIOS storage system 206, and one of skill in the art in possession of the present disclosure will appreciate how the inclusion of the BIOS 208 in the BIOS storage system 206 in the schematic illustration of FIG. 2 may indicate both BIOS code that is stored in the BIOS storage system 206 (e.g., stored in the primary SPI chip) and BIOS processing functionality (e.g., BIOS firmware) that executes that BIOS code to provide the BIOS 208. The BIOS 208 may include a BIOS memory subsystem such as the BIOS Read-Only Memory (ROM) 210 illustrated in FIG. 2, with the BIOS ROM 210 including a Network Access Control (NAC) region 212 that, as discussed below, may be configured to store Media Access Control (MAC) addresses used by the BIOS 208.

The chassis 202 may also house a secondary BIOS storage system 214 that is coupled to the BIOS backup/recovery engine 204 (e.g., via a coupling between the secondary BIOS storage system 214 and the processing system). In an embodiment, the secondary BIOS storage system 214 may be provided by or included on a secondary SPI chip that is separate and distinct from the primary BIOS storage system 206/primary SPI chip, although other BIOS storage systems are envisioned as falling within the scope of the present disclosure as well. The secondary BIOS storage system 214 may include a data memory subsystem such as the data ROM 216 illustrated in FIG. 2, which one of skill in the art in possession of the present disclosure will appreciate is conventionally utilized to store reference BIOS code and BIOS attribute settings (e.g., BIOS attribute settings utilized by INTEL® reference code, AMD® reference code, or Independent Hardware Vendor (IHV) reference code that would be apparent to one of skill in the art in possession of the present disclosure).

The chassis 202 may also house a communication system 218 that is coupled to the BIOS backup/recovery engine 204 (e.g., via a coupling between the communication system 218 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the BIOS backup/recovery functionality discussed below, while remaining within the scope of the present disclosure as well.

Figure 3A:
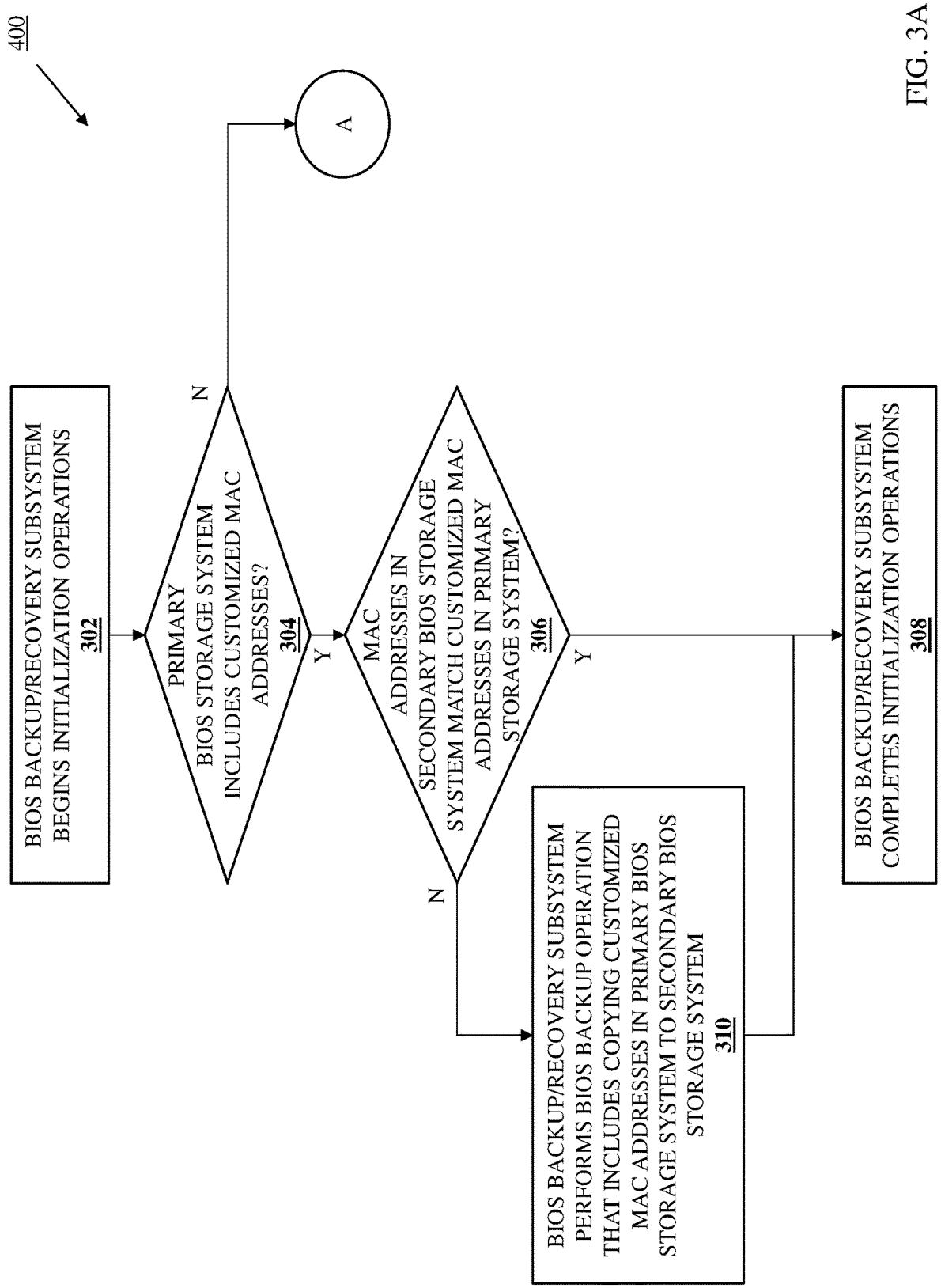
FIG. 3A is a flow chart illustrating an embodiment of a portion of a method for backing up and recovering a BIOS in a computing device.
Figure 3B:
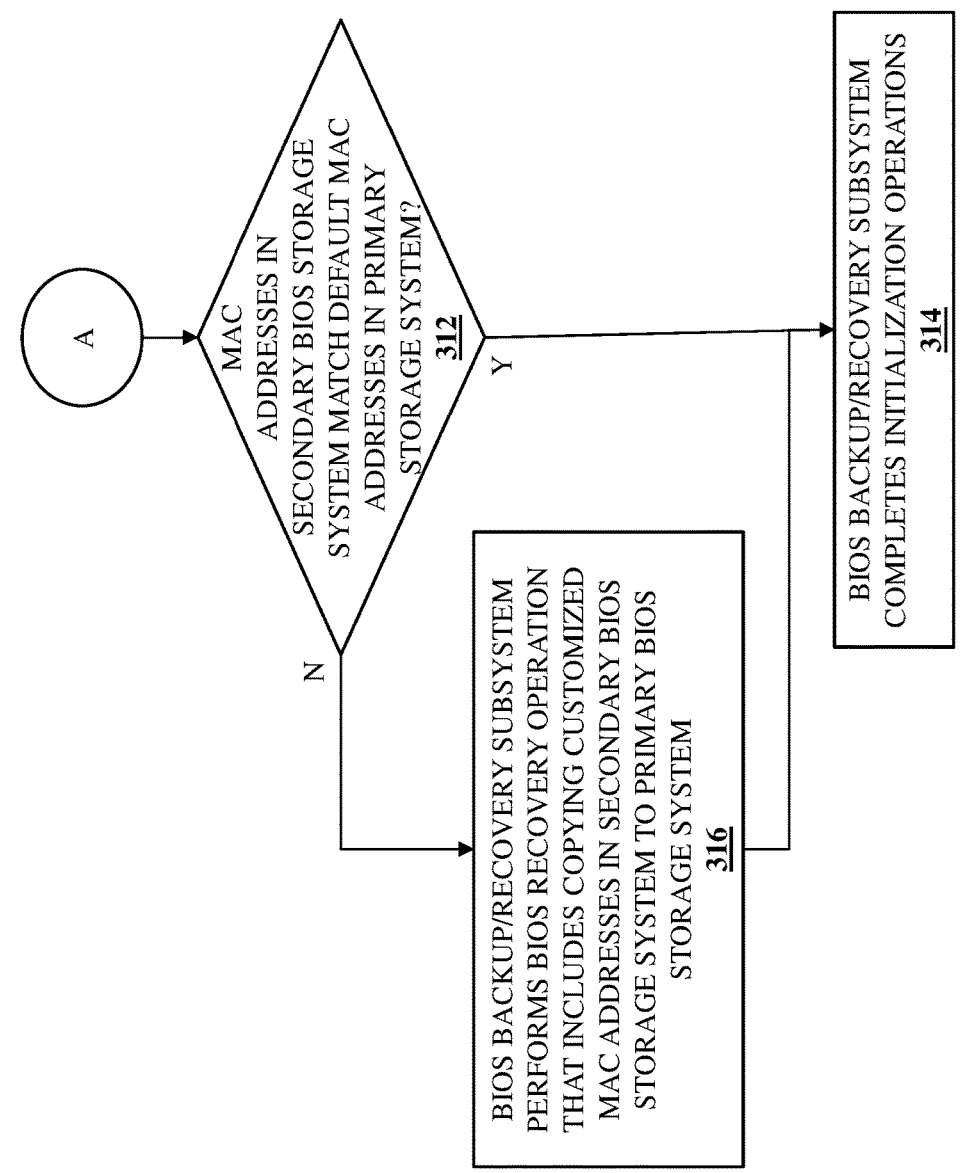
FIG. 3B is a flow chart illustrating an embodiment of a portion of the method of FIG. 3A for backing up and recovering a BIOS in a computing device.

Referring now to FIGS. 3A and 3B, an embodiment of a method 300 for backing up and recovering a Basic Input/Output System (BIOS) in a computing device is illustrated. As discussed below, the systems and methods of the present disclosure provide for the backing up and recovery of customized MAC addresses utilized by a BIOS in a computing device. For example, the BIOS backup/recovery system of the present disclosure may include a chassis housing a BIOS backup/recovery subsystem coupled to a primary and a secondary BIOS storage system. The BIOS backup/recovery subsystem begins initialization operations and determines whether the primary BIOS storage system includes customized MAC addresses. If so, the BIOS backup/recovery subsystem determines whether MAC addresses in the secondary BIOS storage system match the customized MAC addresses in the primary BIOS storage system and, if not, performs a BIOS backup operation that includes copying the customized MAC addresses in the primary BIOS storage system to the secondary BIOS storage system. If not, the BIOS backup/recovery subsystem determines whether MAC addresses in the secondary BIOS storage system match default MAC addresses in the primary BIOS storage system and, if not, performs a BIOS recovery operation that includes copying customized MAC addresses in the secondary BIOS storage system to the primary BIOS storage system. As such, a corrupted BIOS in a computing device may be recovered and provided with the customized MAC addresses it was utilizing prior to the corruption, thus ensuring the computing device operates properly without following the BIOS recovery without the need for intervention from a user.

Figure 4A:
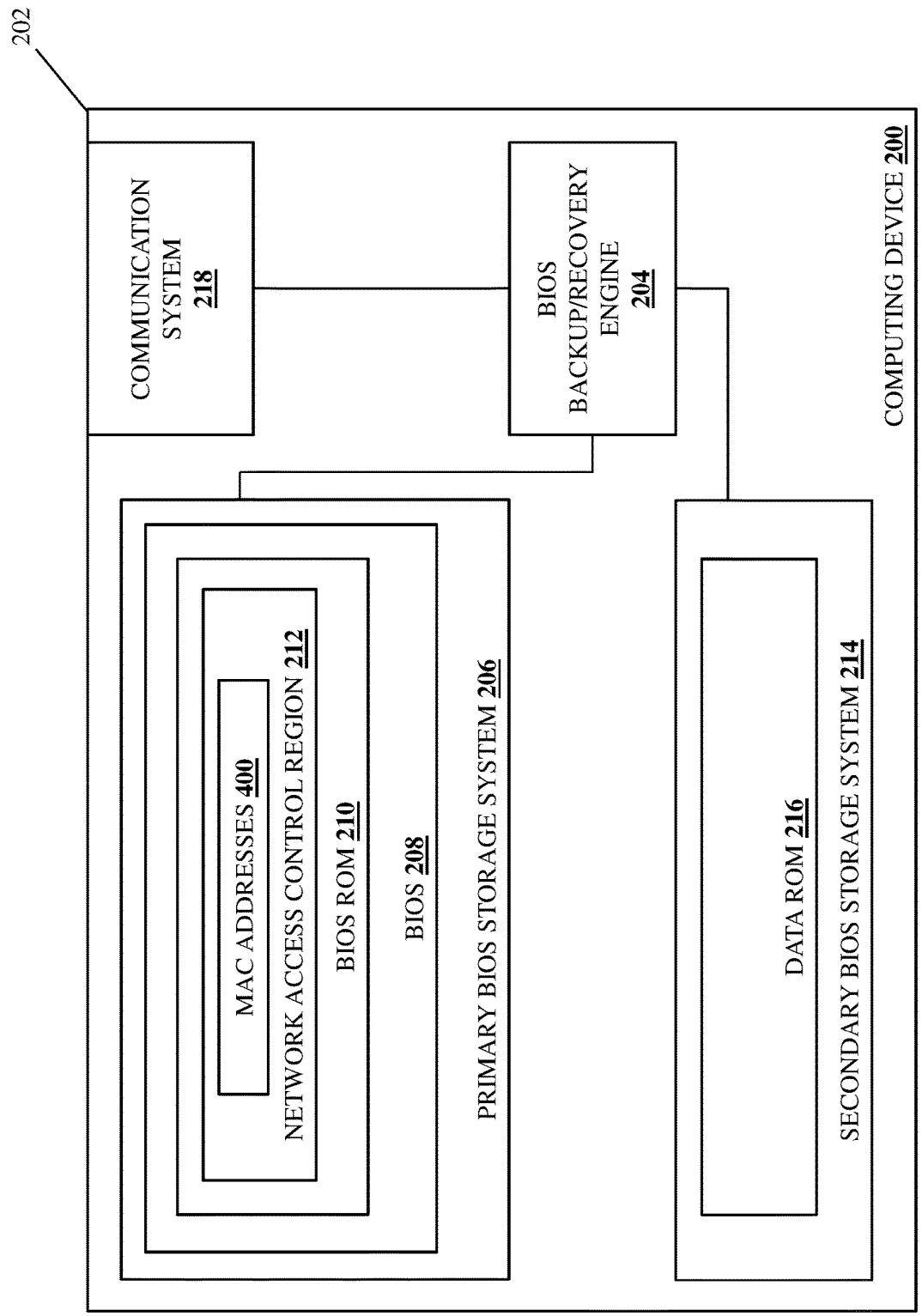
FIG. 4A is a schematic view illustrating an embodiment of the operation of the computing device of FIG. 2 during the method of FIGS. 3A and 3B.
Figure 4B:
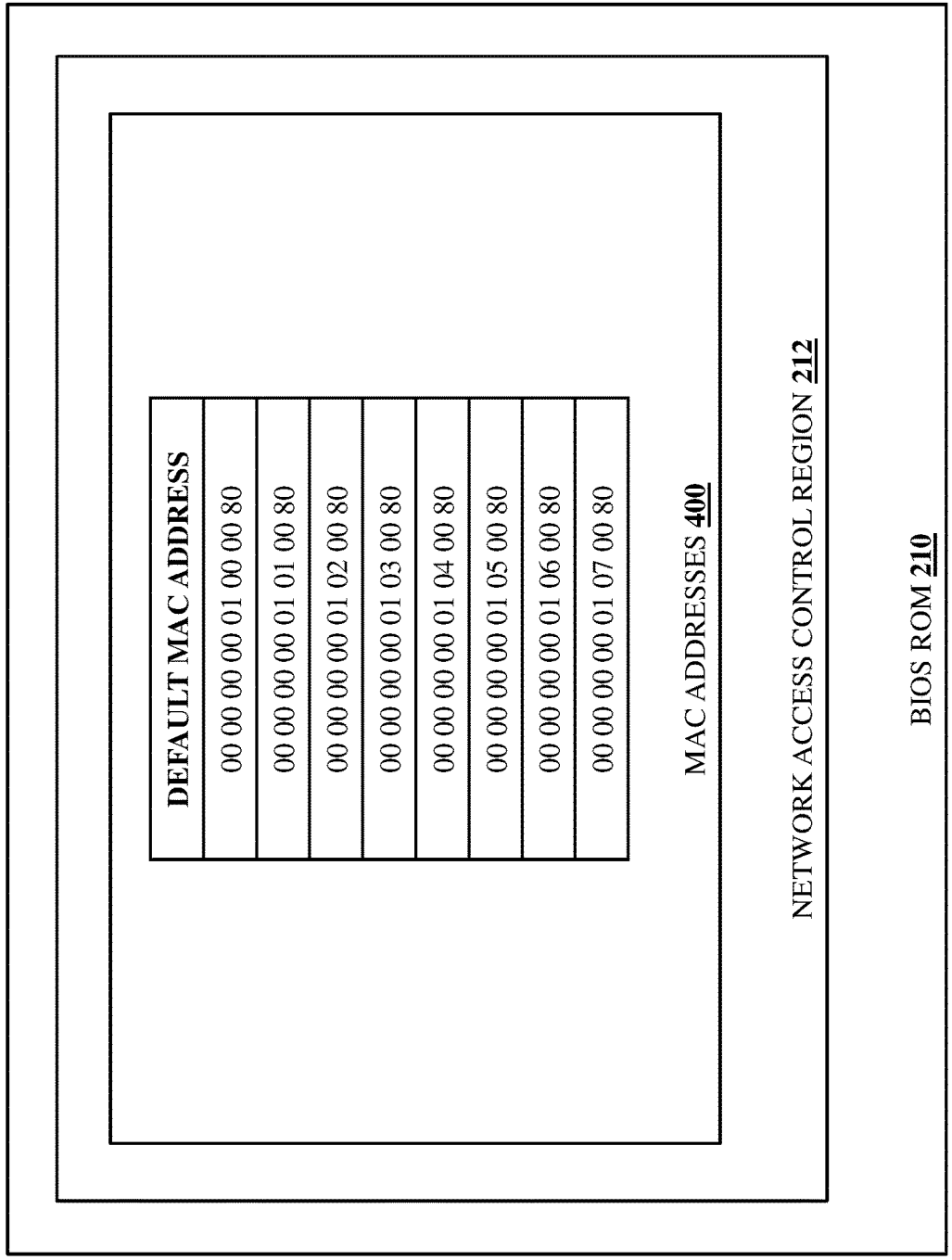
FIG. 4B is a schematic view illustrating an embodiment of a BIOS ROM in the computing device of FIG. 2 during the method of FIGS. 3A and 3B.

With reference to FIG. 4A, an embodiment of the computing device 200 is illustrated that, as discussed above, may be provided during the manufacture of the computing device 200. For example, the computing device 200 illustrated in FIG. 4A may be provided by the manufacturer of the computing device 200 (e.g., DELL® Inc. of Round Rock, Texas, United States) by installing or otherwise providing the primary BIOS storage system 206 and/or BIOS 208 from the processing system/BIOS manufacturer (e.g., INTEL® corporation of Santa Clara, California, United States) in the computing device 200, although one of skill in the art in possession of the present disclosure will appreciate how the computing device 200 illustrated in FIG. 4A may be provided in a variety of manners that will fall within the scope of the present disclosure as well. As can be seen in FIG. 4B, the primary storage system 206/BIOS 208 may be initially provided with MAC addresses 400 included in the NAC region 212 of its BIOS ROM 210 that are "default" MAC addresses generated and/or otherwise provided at the processing system/BIOS manufacturer factory. For example, the MAC addresses 400 are illustrated and described as "DEFAULT MAC ADDRESSES" that include "00 00 00 00 01 00 00 80", "00 00 00 00 01 01 00 80", "00 00 00 00 01 02 00 80", "00 00 00 00 01 03 00 80", "00 00 00 00 01 04 00 80", "00 00 00 00 01 05 00 80", "00 00 00 00 01 06 00 80", and "00 00 00 00 01 07 00 80". However, while the provisioning of specific default MAC addresses has been described, one of skill in the art in possession of the present disclosure will appreciate that any of a variety of default MAC addresses will fall within the scope of the present disclosure as well.

Figure 5A:
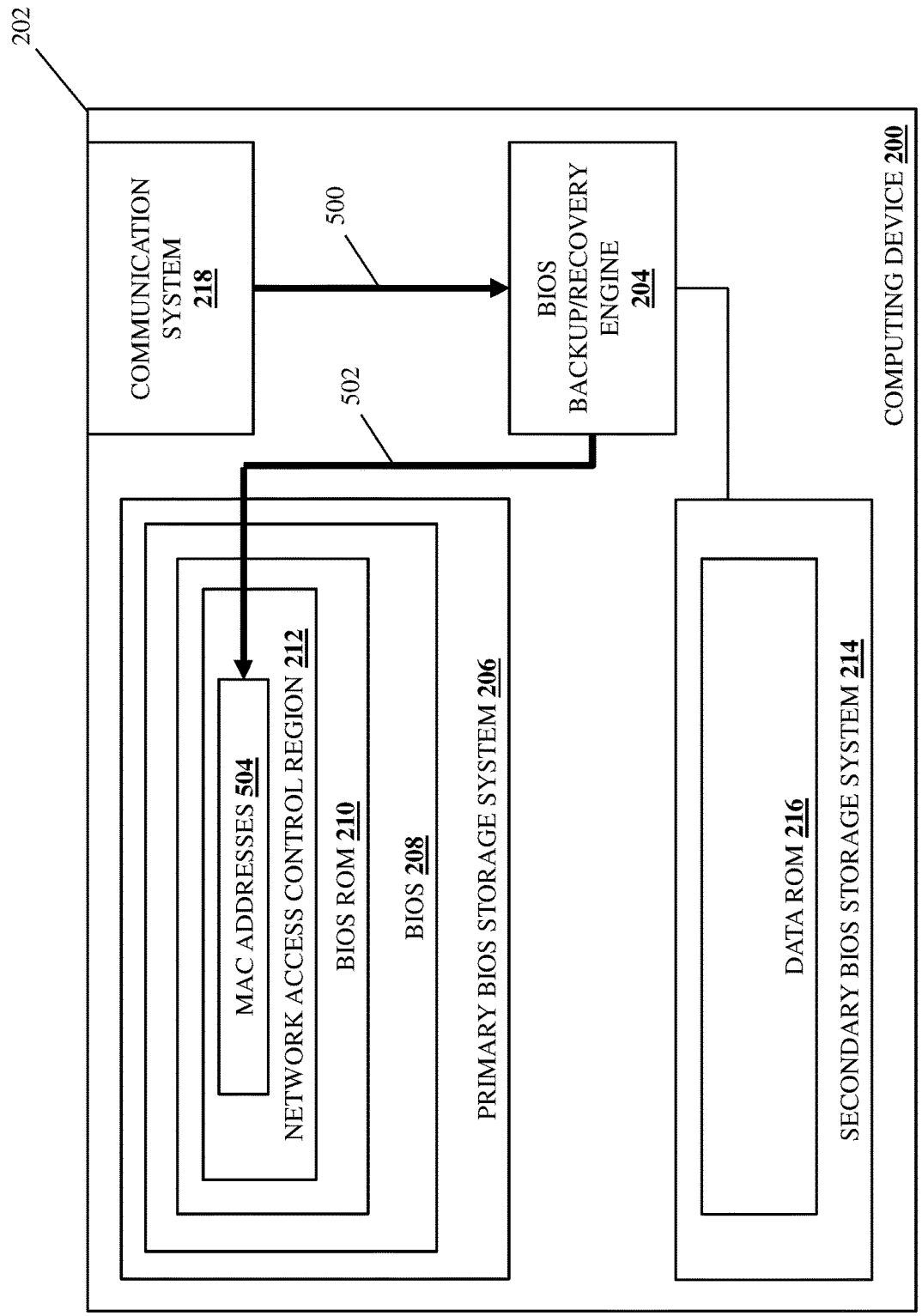
FIG. 5A is a schematic view illustrating an embodiment of the operation of the computing device of FIG. 2 during the method of FIGS. 3A and 3B.

With reference to FIG. 5A, an embodiment of the computing device 200 is illustrated that, as discussed above, may be provided during the manufacture of the computing device 200 and subsequent to the embodiment of the computing device 200 discussed above with reference to FIGS. 4A and 4B. For example, the computing device 200 illustrated in FIG. 5A may be provided by the manufacturer of the computing device 200 (e.g., DELL® Inc. of Round Rock, Texas, United States) via the performance of MAC address customization instruction provisioning operations 500 that may include providing instructions to customize the MAC addresses utilized by the BIOS 208 via the communication system 218 and to the BIOS backup/recovery engine 204 in the computing device 200. As will be appreciated by one of skill in the art in possession of the present disclosure, the default MAC addresses 400 discussed above may present issues in the operation of the computing device 200 such as, for example, preventing the assignment of IP addresses during Dynamic Host Configuration Protocol (DHCP) operations, as well as any other default MAC address issues known in the art, and thus the MAC address customization instruction provisioning operations 500 may be performed to configure "customized" MAC addresses that, when utilized by the BIOS 208, provide "valid" MAC addresses for the purposes of DHCP operations and/or to otherwise ensure proper operation of the computing device 200.

Figure 5B:
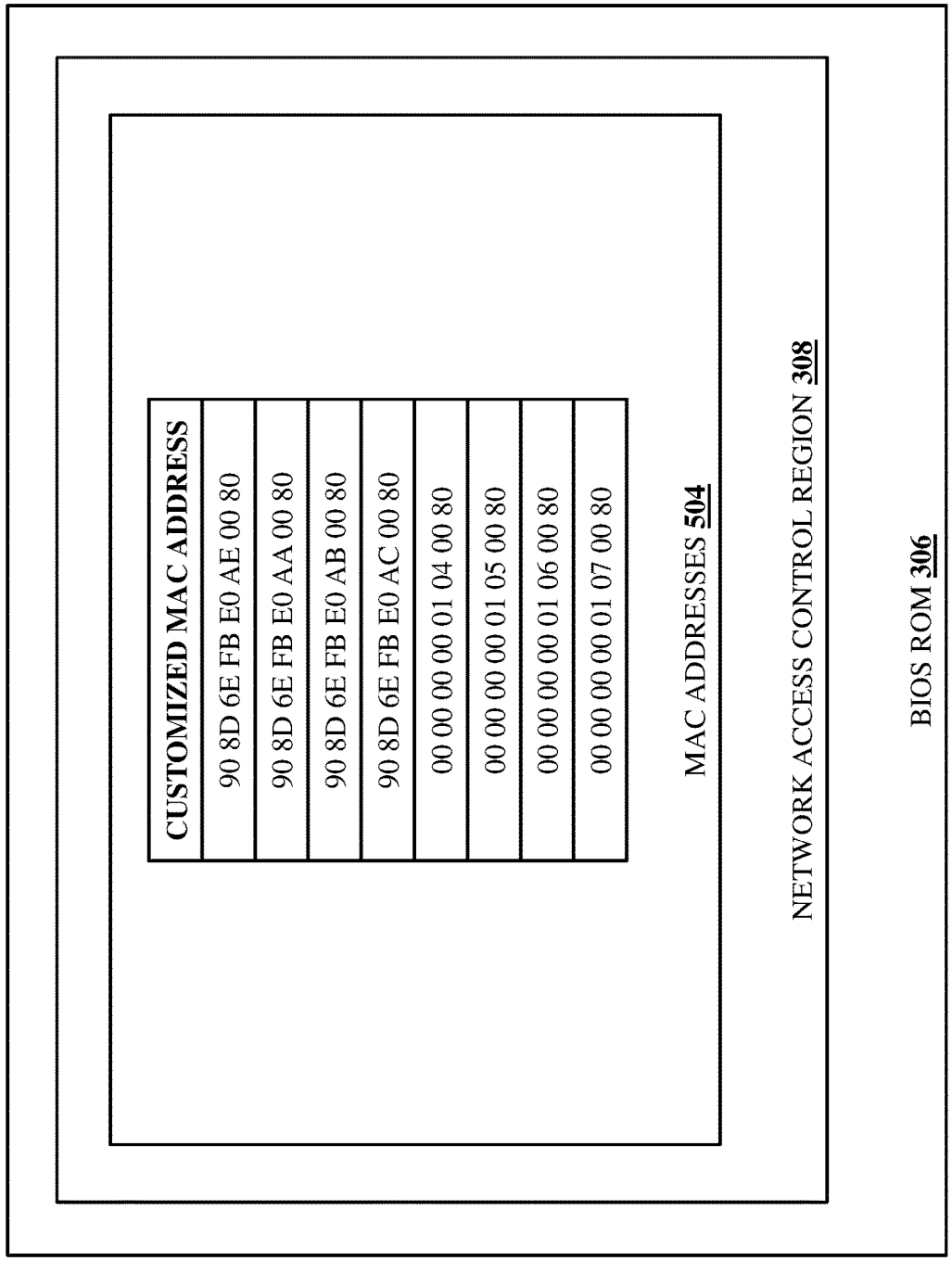
FIG. 5B is a schematic view illustrating an embodiment of a BIOS ROM in the computing device of FIG. 2 during the method of FIGS. 3A and 3B.

In response to receiving the instructions to customize the MAC addresses utilized by the BIOS 208, the BIOS backup/recovery engine 204 in the computing device 200 may perform MAC address customization operations 502 that may include overwriting at least some of the default MAC addresses 400 discussed above with customized MAC addresses (e.g., using a MAC address customization tool such as the "EEupdate.efi" tool available from INTEL® corporation of Santa Clara, California, United States) in order to provide the primary storage system 206/BIOS 208 with MAC addresses 504 in the NAC region 212 of its BIOS ROM 210 that are "customized" MAC addresses generated and/or otherwise provided at the computing device manufacturer factory. For example, with reference to FIG. 5B, the MAC addresses 504 are illustrated and described as "CUSTOMIZED MAC ADDRESSES" that include "90 8D 6E FB E0 AE 00 80", "90 8D 6E FB E0 AA 00 80", "90 8D 6E FB E0 AB 00 80", "90 8D 6E FB E0 AC 00 80", "00 00 00 00 01 04 00 80", "00 00 00 00 01 05 00 80", "00 00 00 00 01 06 00 80", and "00 00 00 00 01 07 00 80".

As such, in the specific example provided herein, the default MAC address "00 00 00 00 01 00 00 80" has been overwritten with the customized MAC address "90 8D 6E FB E0 AE 00 80", the default MAC address "00 00 00 00 01 01 00 80" has been overwritten with the customized MAC address "90 8D 6E FB E0 AA 00 80", the default MAC address "00 00 00 00 01 02 00 80" has been overwritten with the customized MAC address "90 8D 6E FB E0 AB 00 80", and the default MAC address "00 00 00 00 01 03 00 80" has been overwritten with the customized MAC address "90 8D 6E FB E0 AC 00 80", with the default MAC addresses "00 00 00 00 01 04 00 80", "00 00 00 00 01 05 00 80", "00 00 00 00 01 06 00 80", and "00 00 00 00 01 07 00 80" remaining unchanged. However, while the provisioning of specific customized MAC addresses has been described, one of skill in the art in possession of the present disclosure will appreciate that any of a variety of customized MAC addresses will fall within the scope of the present disclosure as well.

The method 300 begins at block 302 where a BIOS backup/recovery subsystem begins initialization operations. In an embodiment, at block 302, the computing device 200 may be powered on, booted, reset, rebooted, and/or otherwise initialized such that the BIOS backup/recovery engine 204 begins initialization operations such as, for example, a Power-On Self-Test (POST) and/or other initialization operations that would be apparent to one of skill in the art in possession of the present disclosure.

Figure 6A:
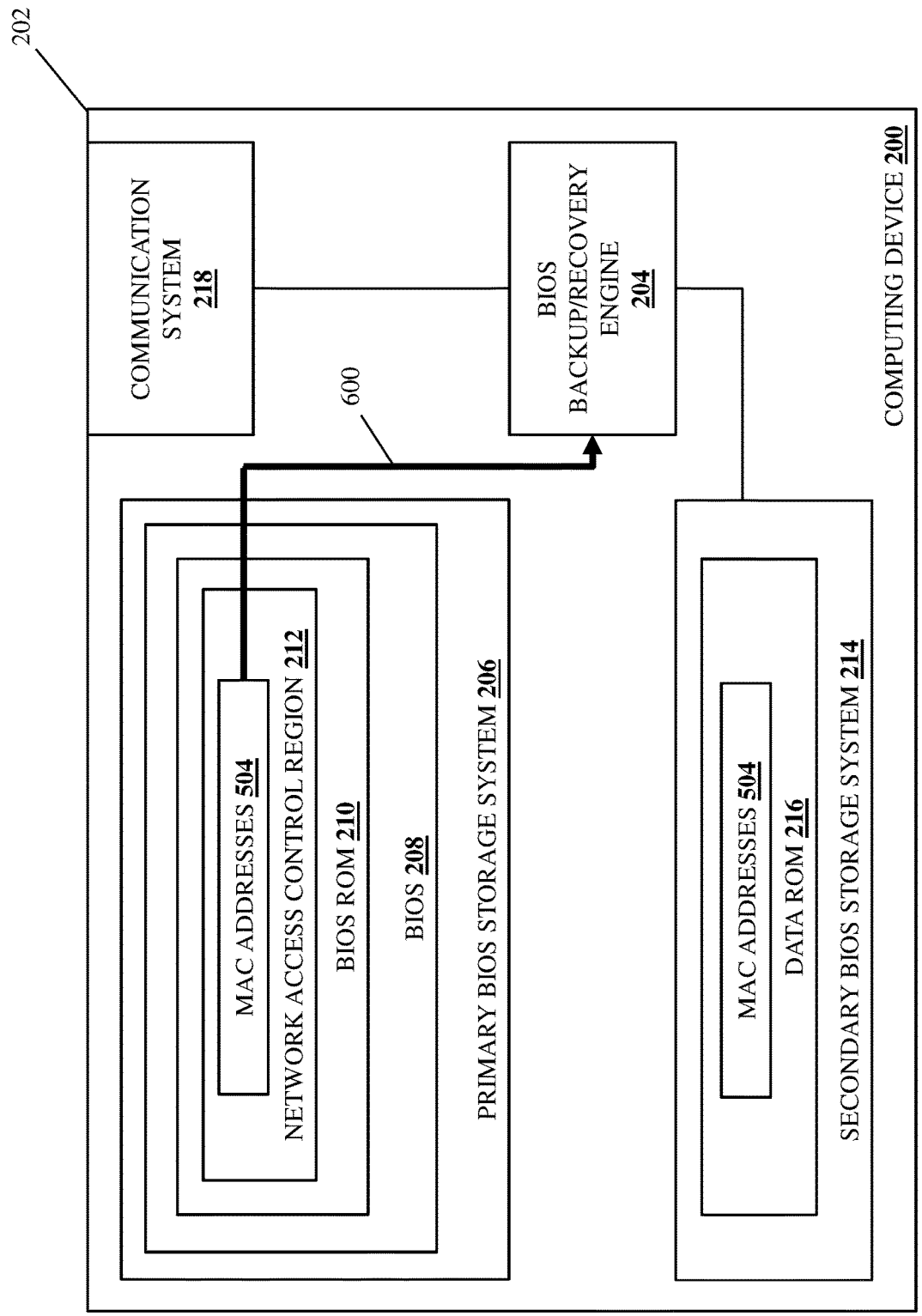
FIG. 6A is a schematic view illustrating an embodiment of the operation of the computing device of FIG. 2 during the method of FIGS. 3A and 3B.
Figure 6B:
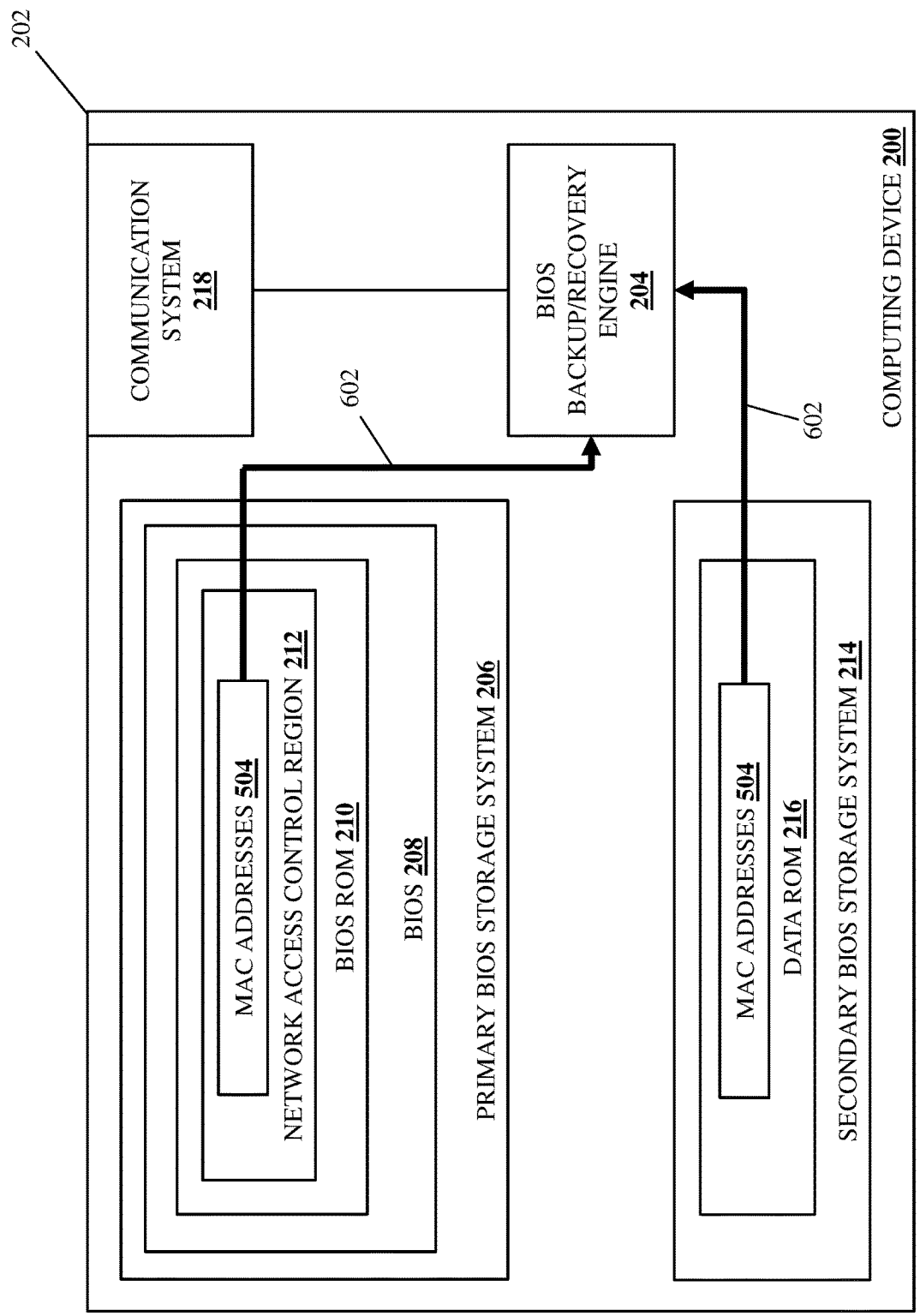
FIG. 6B is a schematic view illustrating an embodiment of the operation of the computing device of FIG. 2 during the method of FIGS. 3A and 3B.

The method 300 then proceeds to decision block 304 where it is determined whether a primary BIOS storage system includes customized MAC addresses. With reference to FIGS. 6A and 6B, an embodiment is illustrated in which the NAC region 212 of the BIOS ROM 210 in the BIOS 208 provided in the primary BIOS storage system 206 includes the customized MAC addresses 504 discussed above, and the data ROM 216 in the secondary BIOS storage system 214 includes the customized MAC addresses 504 as well. As illustrated in FIG. 6A, in an embodiment of decision block 304, the BIOS backup/recovery engine 204 in the computing device 200 may perform primary BIOS storage system customized MAC address determination operations 600 that may include accessing the NAC region 212 of the BIOS ROM 210 included in the BIOS 208 provided in the primary BIOS storage system 206 to determine whether customized MAC addresses are included in the NAC region 212 of the BIOS ROM 210.

To provide a specific example, the primary BIOS storage system customized MAC address determination operations 600 may include accessing a Preserved Field Area (PFA) in the BIOS ROM 210 that may be provided be a non-volatile memory used to store run-time configuration data that is not overwritten during firmware updates, and that may include PFA data such as any of the MAC addresses described herein, an offset or location of the MAC addresses, a checksum that is configured to verify the accuracy of the MAC addresses, and an offset or location of the checksum. As such, the primary BIOS storage system customized MAC address determination operations 600 may include accessing the MAC addresses (and in some examples the checksum) included in the PFA data of the PFA provided in the BIOS ROM 210, storing the MAC addresses (and in some examples the checksum) in its memory system, and determining whether those MAC addresses include customized MAC addresses.

For example, the format of the default MAC addresses 400 may be fixed (e.g., in the format illustrated in FIG. 4B and discussed above) and known to the BIOS backup/recovery engine 204 in the computing device 200. As such, if a first checksum retrieved along with first MAC addresses does not match a second checksum retrieved along with second MAC addresses having the default MAC address format, it may be assumed that the first MAC addresses are customized MAC addresses. However, while a specific technique has been described, one of skill in the art in possession of the present disclosure will appreciated how the BIOS backup/recovery engine 204 may be configured to distinguish between default MAC addresses and customized MAC addresses using any of a variety of default/customized MAC address recognition techniques known in the art.

Figure 7A:
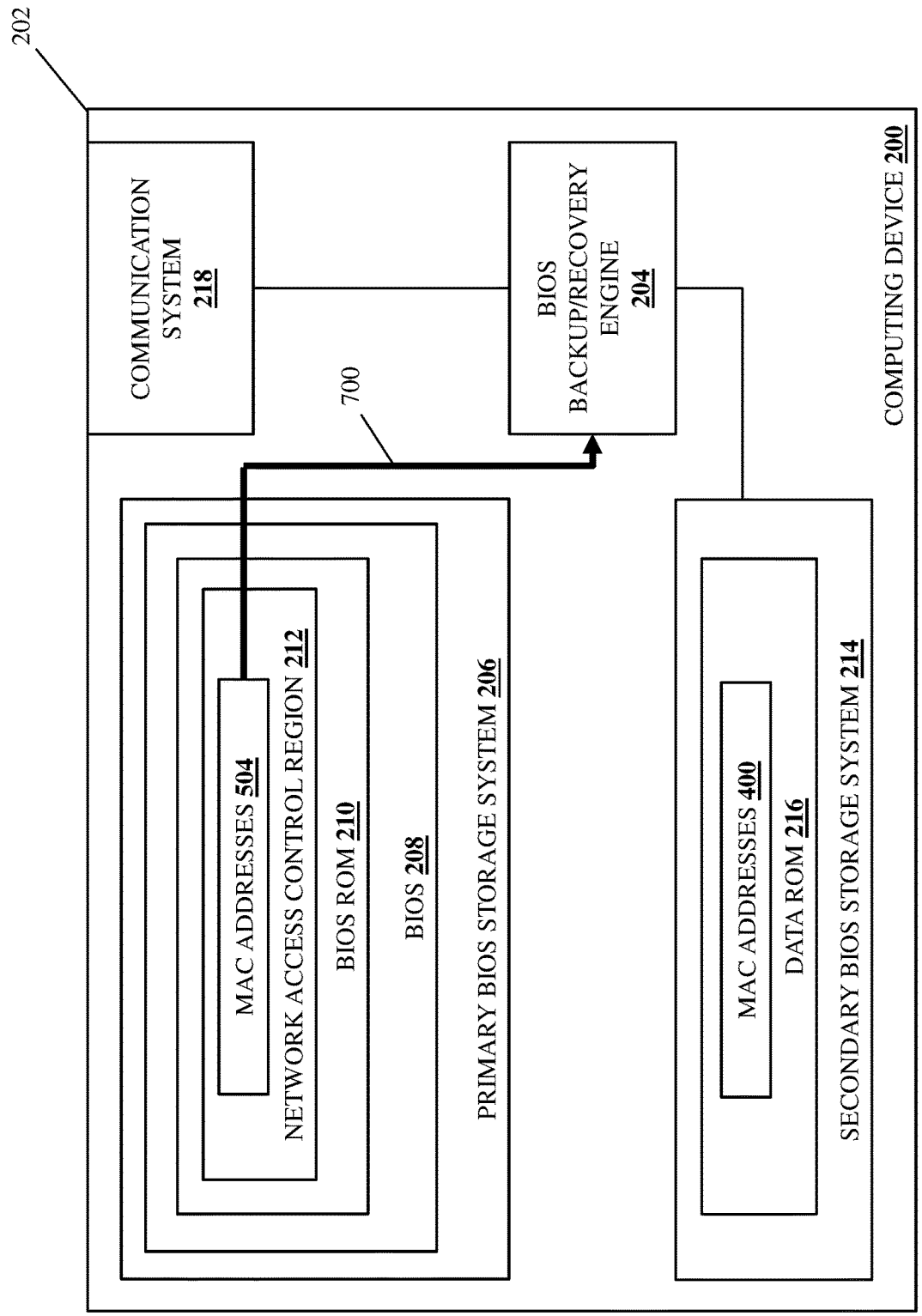
FIG. 7A is a schematic view illustrating an embodiment of the operation of the computing device of FIG. 2 during the method of FIGS. 3A and 3B.
Figure 7B:
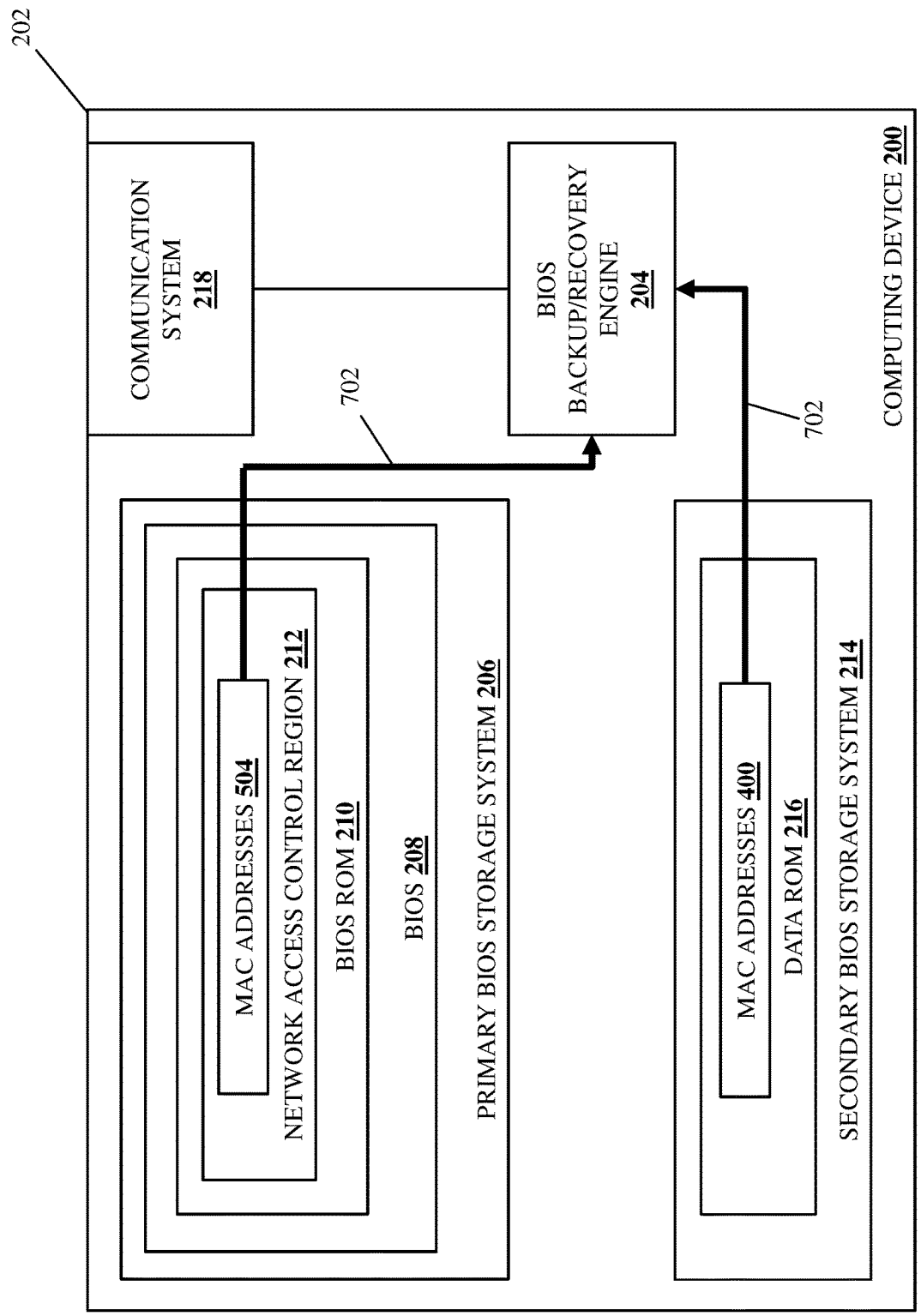
FIG. 7B is a schematic view illustrating an embodiment of the operation of the computing device of FIG. 2 during the method of FIGS. 3A and 3B.
Figure 7C:
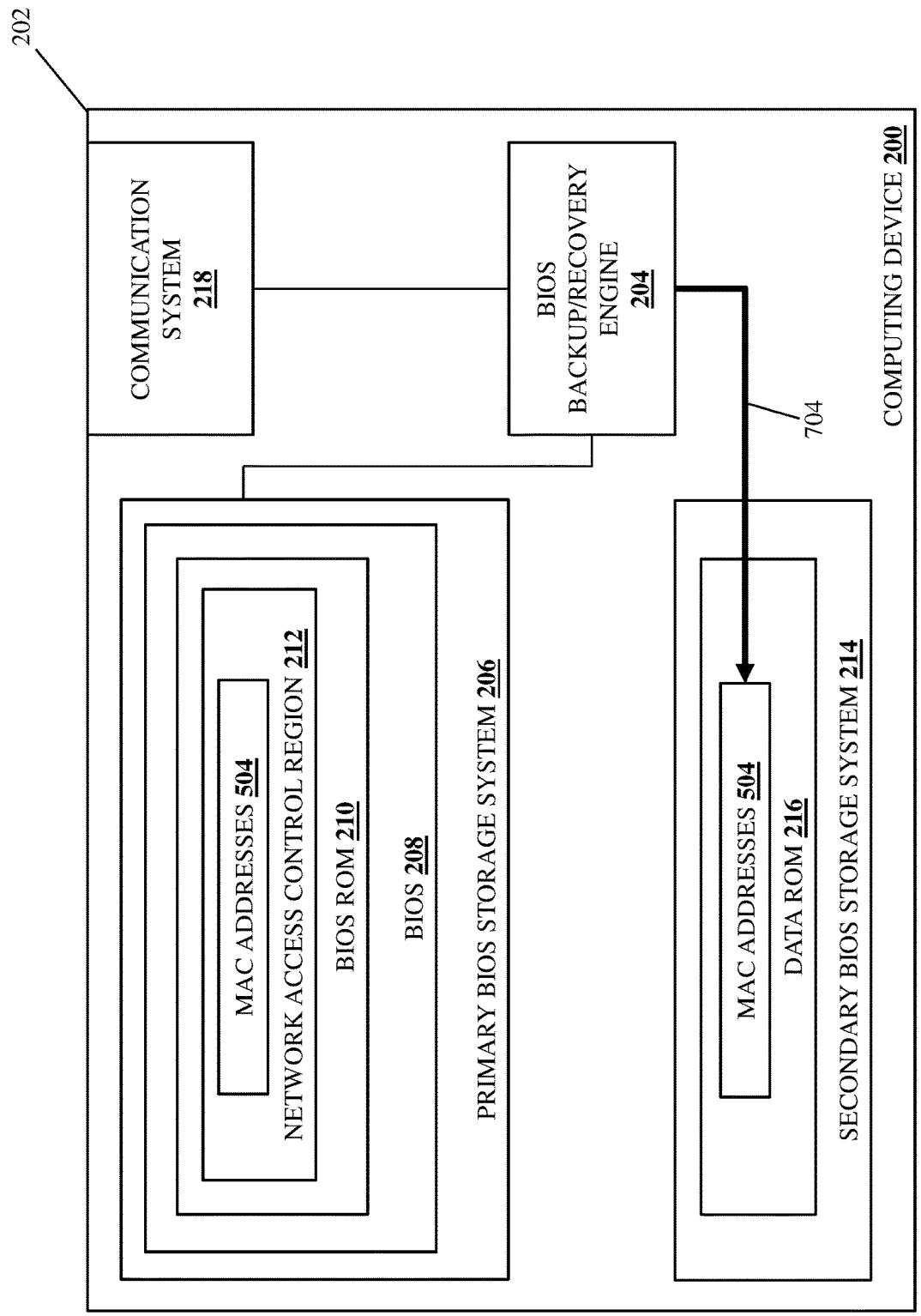
FIG. 7C is a schematic view illustrating an embodiment of the operation of the computing device of FIG. 2 during the method of FIGS. 3A and 3B.

With reference to FIGS. 7A, 7B, and 7C, an embodiment is illustrated in which the NAC region 212 of the BIOS ROM 210 in the BIOS 208 provided in the primary BIOS storage system 206 includes the customized MAC addresses 504 discussed above, and the data ROM 216 in the secondary BIOS storage system 214 includes the default MAC addresses 400 discussed above. As illustrated in FIG. 7A, in an embodiment of decision block 304, the BIOS backup/recovery engine 204 in the computing device 200 may perform primary BIOS storage system customized MAC address determination operations 700 that may include accessing the NAC region 212 of the BIOS ROM 210 included in the BIOS 208 provided in the primary BIOS storage system 206 to determine whether customized MAC addresses are included in the NAC region 212 of the BIOS ROM 210.

Similarly as discussed above, in a specific example, the primary BIOS storage system customized MAC address determination operations 700 may include accessing PFA in the BIOS ROM 210 that may be provided be a non-volatile memory used to store run-time configuration data that is not overwritten during firmware updates, and that may include PFA data such as any of the MAC addresses described herein, an offset or location of the MAC addresses, a checksum that is configured to verify the accuracy of the MAC addresses, and an offset or location of the checksum. As such, the primary BIOS storage system customized MAC address determination operations 700 may include accessing the MAC addresses (and in some examples the checksum) included in the PFA data of the PFA provided in the BIOS ROM 210, storing the MAC addresses (and in some examples the checksum) in its memory system, and determining whether those MAC addresses include customized MAC addresses. As discussed above, the BIOS backup/ recovery engine 204 may be configured to distinguish between default MAC addresses and customized MAC addresses using any of a variety of default/customized MAC address recognition techniques known in the art.

Figure 8A:
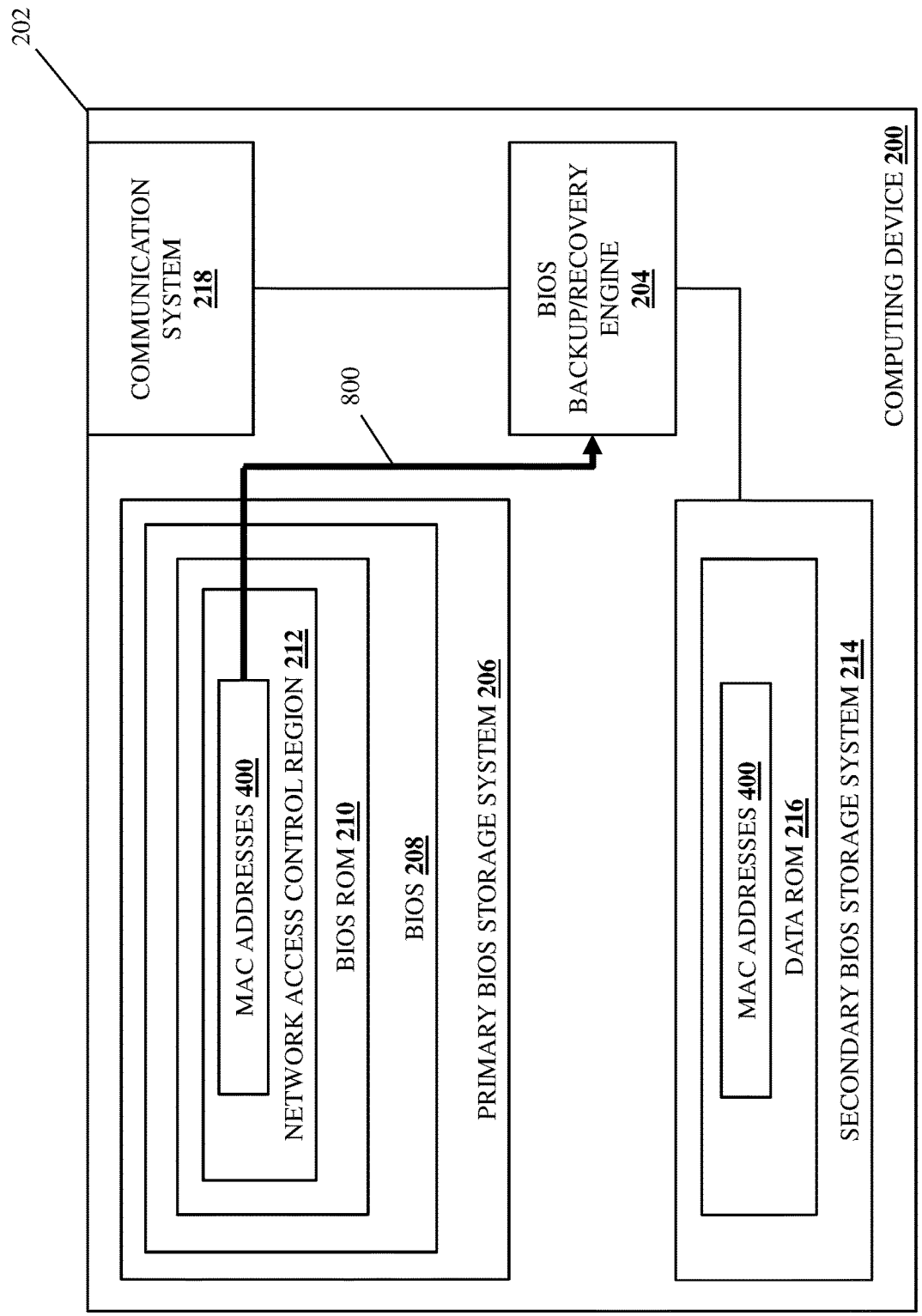
FIG. 8A is a schematic view illustrating an embodiment of the operation of the computing device of FIG. 2 during the method of FIGS. 3A and 3B.
Figure 8B:
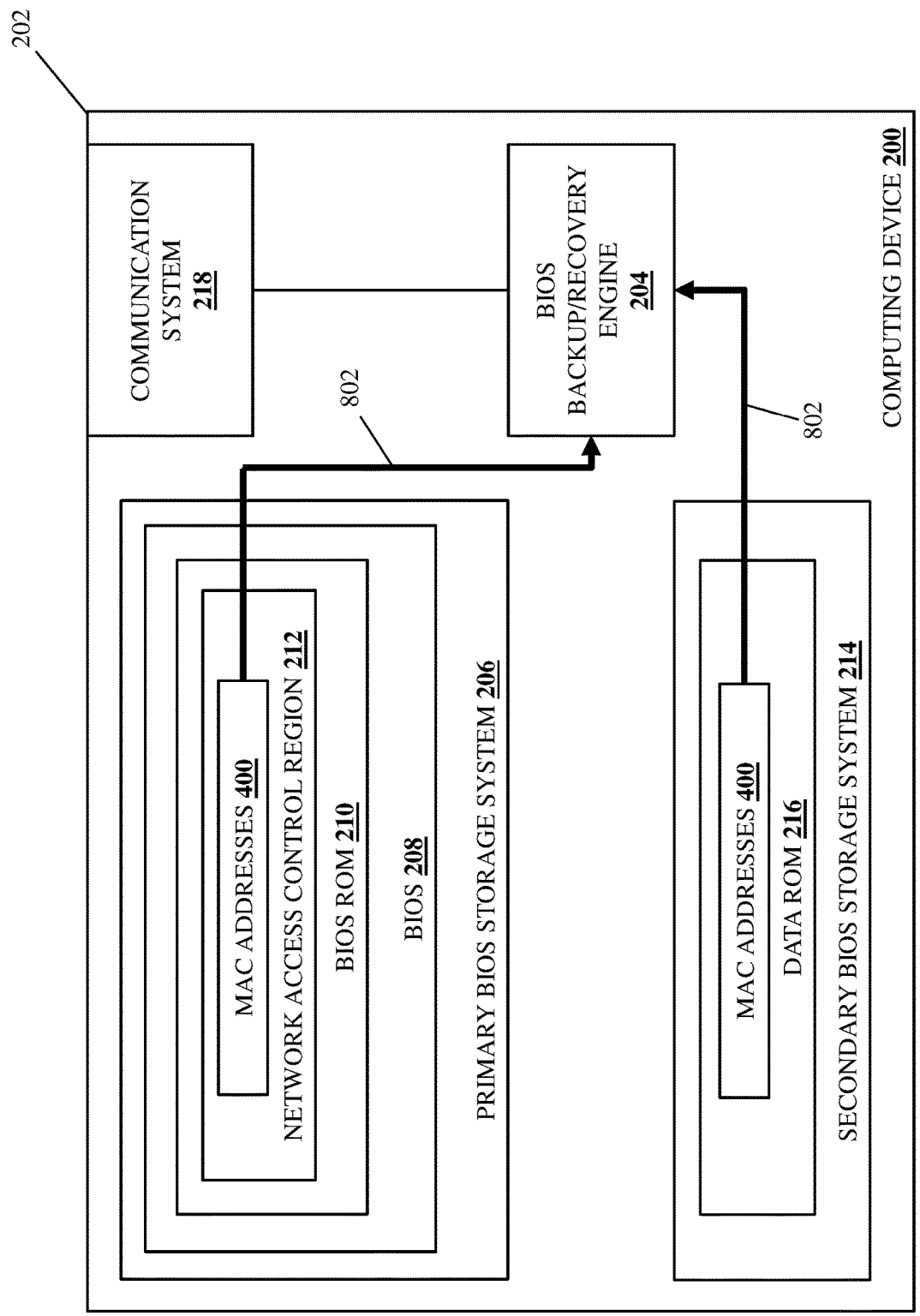
FIG. 8B is a schematic view illustrating an embodiment of the operation of the computing device of FIG. 2 during the method of FIGS. 3A and 3B.

With reference to FIGS. 8A and 8B, an embodiment is illustrated in which the NAC region 212 of the BIOS ROM 210 in the BIOS 208 provided in the primary BIOS storage system 206 includes the default MAC addresses 400 discussed above, and the data ROM 216 in the secondary BIOS storage system 214 includes the default MAC addresses 400 as well. As illustrated in FIG. 8A, in an embodiment of decision block 304, the BIOS backup/recovery engine 204 in the computing device 200 may perform primary BIOS storage system customized MAC address determination operations 800 that may include accessing the NAC region 212 of the BIOS ROM 210 included in the BIOS 208 provided in the primary BIOS storage system 206 to determine whether customized MAC addresses are included in the NAC region 212 of the BIOS ROM 210.

Similarly as discussed above, in a specific example, the primary BIOS storage system customized MAC address determination operations 800 may include accessing PFA in the BIOS ROM 210 that may be provided be a non-volatile memory used to store run-time configuration data that is not overwritten during firmware updates, and that may include PFA data such as any of the MAC addresses described herein, an offset or location of the MAC addresses, a checksum that is configured to verify the accuracy of the MAC addresses, and an offset or location of the checksum. As such, the primary BIOS storage system customized MAC address determination operations 800 may include accessing the MAC addresses (and in some examples the checksum) included in the PFA data of the PFA provided in the BIOS ROM 210, storing the MAC addresses (and in some examples the checksum) in its memory system, and determining whether those MAC addresses include customized MAC addresses. As discussed above, the BIOS backup/recovery engine 204 may be configured to distinguish between default MAC addresses and customized MAC addresses using any of a variety of default/customized MAC address recognition techniques known in the art.

Figure 9A:
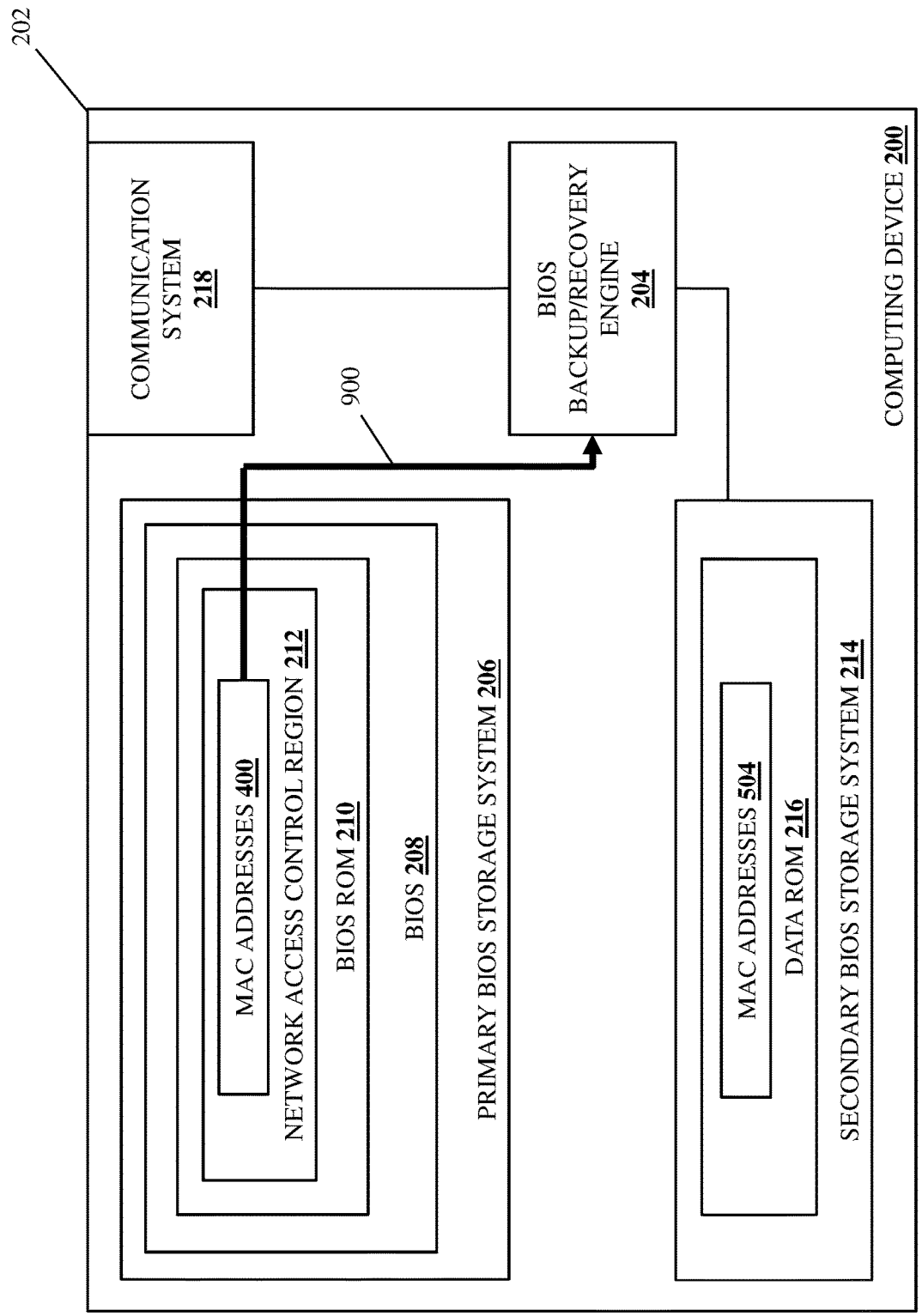
FIG. 9A is a schematic view illustrating an embodiment of the operation of the computing device of FIG. 2 during the method of FIGS. 3A and 3B.
Figure 9B:
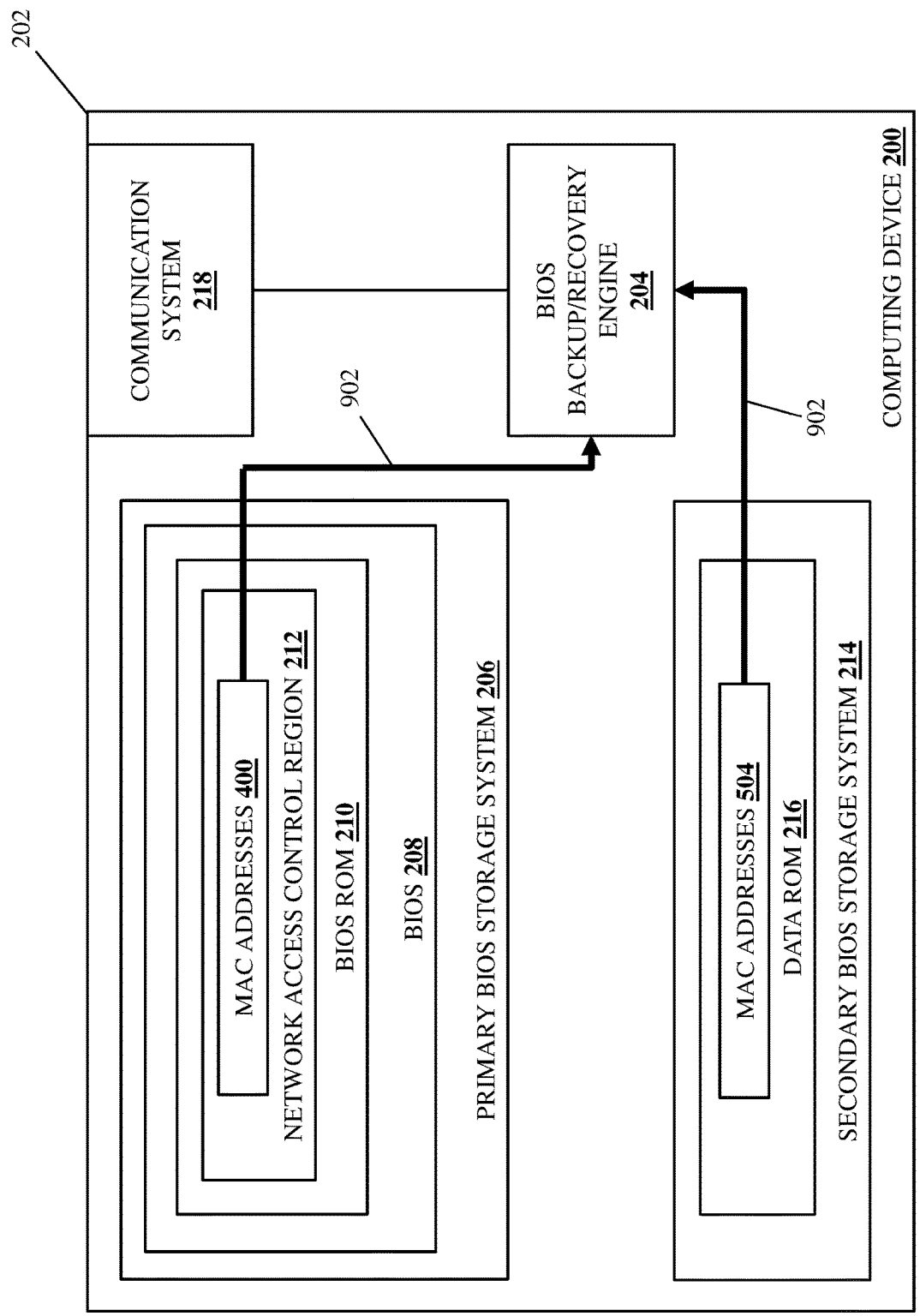
FIG. 9B is a schematic view illustrating an embodiment of the operation of the computing device of FIG. 2 during the method of FIGS. 3A and 3B.
Figure 9C:
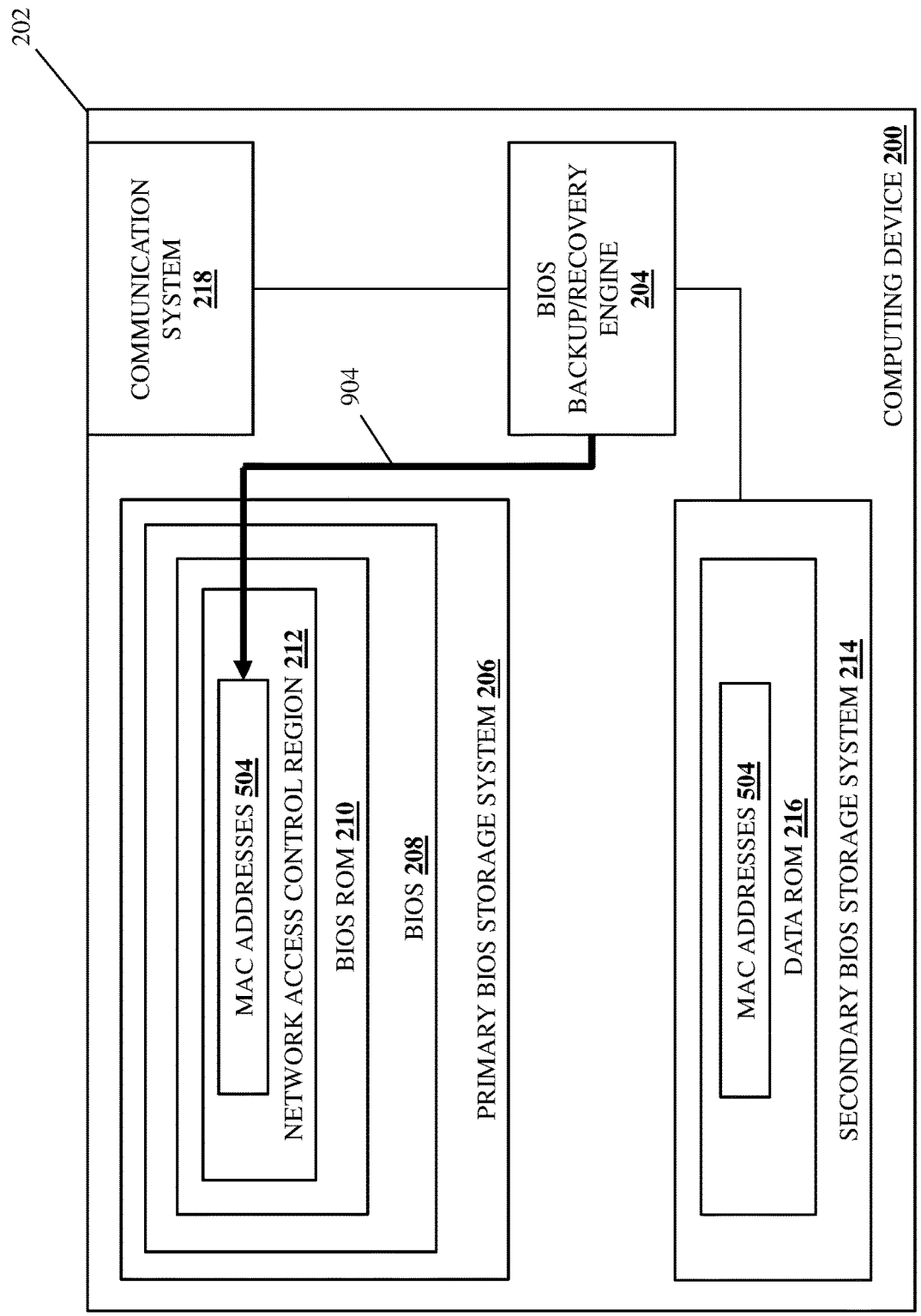
FIG. 9C is a schematic view illustrating an embodiment of the operation of the computing device of FIG. 2 during the method of FIGS. 3A and 3B.

With reference to FIGS. 9A, 9B, and 9C, an embodiment is illustrated in which the NAC region 212 of the BIOS ROM 210 in the BIOS 208 provided in the primary BIOS storage system 206 includes the default MAC addresses 400 discussed above, and the data ROM 216 included in the secondary BIOS storage system 214 includes the customized MAC addresses 504 discussed above. As illustrated in FIG. 9A, in an embodiment of decision block 304, the BIOS backup/recovery engine 204 in the computing device 200 may perform primary BIOS storage system customized MAC address determination operations 900 that may include accessing the NAC region 212 of the BIOS ROM 210 included in the BIOS 208 provided in the primary BIOS storage system 206 to determine whether customized MAC addresses are included in the NAC region 212 of the BIOS ROM 210.

Similarly as discussed above, in a specific example, the primary BIOS storage system customized MAC address determination operations 900 may include accessing PFA in the BIOS ROM 210 that may be provided be a non-volatile memory used to store run-time configuration data that is not overwritten during firmware updates, and that may include PFA data such as any of the MAC addresses described herein, an offset or location of the MAC addresses, a checksum that is configured to verify the accuracy of the MAC addresses, and an offset or location of the checksum. As such, the primary BIOS storage system customized MAC address determination operations 900 may include accessing the MAC addresses (and in some examples the checksum) included in the PFA data of the PFA provided in the BIOS ROM 210, storing the MAC addresses (and in some examples the checksum) in its memory system, and determining whether those MAC addresses include customized MAC addresses. As discussed above, the BIOS backup/recovery engine 204 may be configured to distinguish between default MAC addresses and customized MAC addresses using any of a variety of default/customized MAC address recognition techniques known in the art.

If, at decision block 304, it is determined that the primary BIOS storage system includes customized MAC addresses, the method 300 proceeds to decision block 306 where it is determined whether MAC addresses in a secondary BIOS storage system match customized MAC addresses in the primary storage system. With reference back to the embodiment of FIGS. 6A and 6B in which the NAC region 212 of the BIOS ROM 210 in the BIOS 208 provided in the primary BIOS storage system 206 includes the customized MAC addresses 504 and the data ROM 216 in the secondary BIOS storage system 214 includes the customized MAC addresses 504 as well, in an embodiment of decision block 306, the BIOS backup/recovery engine 204 in the computing device 200 may perform secondary BIOS storage system/primary BIOS storage system MAC address matching determination operations 602.

To provide a specific example, the secondary BIOS storage system/primary BIOS storage system MAC address matching determination operations 602 may include accessing the PFA in the BIOS ROM 210 to retrieve the checksum included in the PFA data in that PFA and storing that checksum in its memory system (or using the checksum that was retrieved as part of the primary BIOS storage system customized MAC address determination operations 600 discussed above and stored in its memory system), accessing the PFA in the data ROM 216 to retrieve the checksum (and in some cases the MAC addresses) included in the PFA data in that PFA and storing that checksum (and in some cases the MAC addresses) in its memory system, and comparing the checksum retrieved from the BIOS ROM 210 to the checksum retrieved for the data ROM 216 to determine whether they match. As will be appreciated by one of skill in the art in possession of the present disclosure, matching checksums retrieved from the BIOS ROM 210 and the data ROM 216 are indicative of matching MAC addresses in the BIOS ROM 210 and the data ROM 216 (e.g., matching customized MAC addresses 504 in this example), while unmatching checksums retrieved from the BIOS ROM 210 and the data ROM 216 are indicative of different MAC addresses in the BIOS ROM 210 and the data ROM 216.

With reference back to the embodiment of FIGS. 7A, 7B, and 7C in which the NAC region 212 of the BIOS ROM 210 in the BIOS 208 provided in the primary BIOS storage system 206 includes he customized MAC addresses 504 and the data ROM 216 included in the secondary BIOS storage system 214 includes the default MAC addresses 400, in an embodiment of decision block 306, the BIOS backup/recovery engine 204 in the computing device 200 may perform secondary BIOS storage system/primary BIOS storage system MAC address matching determination operations 702.

Similarly as described in the specific example provided above, the secondary BIOS storage system/primary BIOS storage system MAC address matching determination operations 702 may include accessing the PFA in the BIOS ROM 210 to retrieve the checksum included in the PFA data in that PFA and storing that checksum in its memory system (or using the checksum that was retrieved as part of the primary BIOS storage system customized MAC address determination operations 700 discussed above and stored in its memory system), accessing the PFA in the data ROM 216 to retrieve the checksum (and in some cases the MAC addresses) included in the PFA data in that PFA and storing that checksum (and in some cases the MAC addresses) in its memory system, and comparing the checksum retrieved from the BIOS ROM 210 to the checksum retrieved for the data ROM 216 to determine whether they match. As will be appreciated by one of skill in the art in possession of the present disclosure, matching checksums retrieved from are indicative of matching MAC addresses in the BIOS ROM 210 and the data ROM 216, while unmatching checksums retrieved from the BIOS ROM 210 and the data ROM 216 are indicative of different MAC addresses in the BIOS ROM 210 and the data ROM 216 (e.g., the unmatching customized MAC addresses 504 in the BIOS ROM 210 and default MAC addresses 400 in the data ROM 216 in this example).

If at decision block 306, it is determined that the MAC addresses in the secondary BIOS storage system match the customized MAC addresses in the primary storage system, the method 300 proceeds to block 308 where the BIOS backup/recovery subsystem completes the initialization operations. With reference back to the embodiment of FIGS. 6A and 6B in which the NAC region 212 of the BIOS ROM 210 in the BIOS 208 provided in the primary BIOS storage system 206 includes the customized MAC addresses 504 discussed above and the data ROM 216 included in the secondary BIOS storage system 214 includes the customized MAC addresses 504 as well, in an embodiment of block 308 and following the determination that the BIOS ROM 210 and the data ROM 216 both store the customized MAC addresses 504, the BIOS backup/recovery engine 204 in the computing device 200 may perform initialization completion operations that include completing POST and/or other initialization operations that would be apparent to one of skill in the art in possession of the present disclosure. As such, in the event the BIOS ROM 210 and the data ROM 216 both store the same customized MAC addresses, initialization operations may be completed without modifying the MAC addresses included in either of the BIOS ROM 210 and the data ROM 216.

If at decision block 306, it is determined that the MAC addresses in the secondary BIOS storage system do not match the customized MAC addresses in the primary storage system, the method 300 proceeds to block 310 where the BIOS backup/recovery subsystem performs a BIOS backup operation that includes copying the customized MAC addresses in the primary BIOS storage system to the secondary BIOS storage system. With reference back to the embodiment of FIGS. 7A, 7B, and 7C in which the NAC region 212 of the BIOS ROM 210 in the BIOS 208 provided in the primary BIOS storage system 206 includes the customized MAC addresses 504 discussed above and the data ROM 216 in the secondary BIOS storage system 214 includes the default MAC addresses 400 discussed above, in an embodiment of block 310 and following the determination that default MAC addresses 400 stored the data ROM 216 do not match the customized MAC addresses 504 stored in the BIOS ROM 210, the BIOS backup/recovery engine 204 in the computing device 200 may perform BIOS backup operations 704 that include copying the customized MAC addresses 504 stored in the BIOS ROM 210 to the data ROM 216 (e.g., overwriting the default MAC addresses 400 in the data ROM 216 with the customized MAC addresses 504).

As will be appreciated by one of skill in the art in possession of the present disclosure, the customized MAC addresses 504 copied to the data ROM 216 at block 310 by the BIOS backup/recovery engine 204 may be the customized MAC addresses that were retrieved as part of the primary BIOS storage system customized MAC address determination operations 700 discussed above and stored in its memory system (as illustrated in FIG. 7C), or may be retrieved from the BIOS ROM 210 at block 310 in order to perform that copying. In a specific example, the customized MAC addresses 504 may be copied to the data ROM 216 at block 310 by copying the PFA data retrieved from the BIOS ROM 210 to the data ROM 216. In some embodiments, the BIOS backup operations 704 may include calculating a checksum for the customized MAC addresses 504 that were copied to the data ROM 216 and verifying that it matches the checksum for the customized MAC addresses 504 stored in the BIOS ROM 210 to ensure that the customized MAC addresses 504 that were copied to the data ROM 216 are correct.

Following block 310, the method 300 proceeds to block 308 where the BIOS backup/recovery subsystem completes the initialization operations similarly as discussed above. As such, at block 308 and following the BIOS backup operations 704, the BIOS backup/recovery engine 204 in the computing device 200 may perform initialization completion operations that include completing POST and/or other initialization operations that would be apparent to one of skill in the art in possession of the present disclosure. As such, in the event the BIOS ROM 210 stores customized MAC addresses (e.g., MAC addresses that are valid for the purposes of DHCP operations) and the data ROM 216 stores default MAC addresses, initialization operations may be completed after backing up the customized MAC addresses from the BIOS ROM 210 in the data ROM 216. As such, following the provisioning and/or updating of customized/valid MAC addresses in the BIOS ROM 210, those customized/valid MAC addresses will be backed up in the data ROM 216.

If, at decision block 304, it is determined that the primary BIOS storage system does not include customized MAC addresses, the method 300 proceeds to decision block 312 where it is determined whether MAC addresses in the secondary BIOS storage system match default MAC addresses in the primary storage system. With reference back to the embodiment of FIGS. 8A and 8B in which the NAC region 212 of the BIOS ROM 210 in the BIOS 208 provided in the primary BIOS storage system 206 includes the default MAC addresses 400 discussed above and the data ROM 216 in the secondary BIOS storage system 214 includes the default MAC addresses 400 as well, in an embodiment of decision block 312, the BIOS backup/recovery engine 204 in the computing device 200 may perform secondary BIOS storage system/primary BIOS storage system MAC address matching determination operations 802.

To provide a specific example, the secondary BIOS storage system/primary BIOS storage system MAC address matching determination operations 802 may include accessing the PFA in the BIOS ROM 210 to retrieve the checksum included in the PFA data in that PFA and storing that checksum in its memory system (or using the checksum that was retrieved as part of the primary BIOS storage system customized MAC address determination operations 800 discussed above and stored in its memory system), accessing the PFA in the data ROM 216 to retrieve the checksum (and in some cases the MAC addresses) included in the PFA data in that PFA and storing that checksum (and in some cases the MAC addresses) in its memory system, and comparing the checksum retrieved from the BIOS ROM 210 to the checksum retrieved for the data ROM 216 to determine whether they match. As will be appreciated by one of skill in the art in possession of the present disclosure, matching checksums retrieved from the BIOS ROM 210 and the data ROM 216 are indicative of matching MAC addresses in the BIOS ROM 210 and the data ROM 216 (e.g., matching default MAC addresses 400 in this example), while unmatching checksums retrieved from the BIOS ROM 210 and the data ROM 216 are indicative of different MAC addresses in the BIOS ROM 210 and the data ROM 216.

With reference back to the embodiment of FIGS. 9A, 9B, and 9C in which the NAC region 212 of the BIOS ROM 210 in the BIOS 208 provided in the primary BIOS storage system 206 includes the default MAC addresses 400 discussed above and the data ROM 216 included in the secondary BIOS storage system 214 includes the customized MAC addresses 504 discussed above, in an embodiment of decision block 312, the BIOS backup/recovery engine 204 in the computing device 200 may perform secondary BIOS storage system/primary BIOS storage system MAC address matching determination operations 902.

Similarly as described in the specific example provided above, the secondary BIOS storage system/primary BIOS storage system MAC address matching determination operations 902 may include accessing the PFA in the BIOS ROM 210 to retrieve the checksum included in the PFA data in that PFA and storing that checksum in its memory system (or using the checksum that was retrieved as part of the primary BIOS storage system customized MAC address determination operations 900 discussed above and stored in its memory system), accessing the PFA in the data ROM 216 to retrieve the checksum (and in some cases the MAC addresses) included in the PFA data in that PFA and storing that checksum (and in some cases the MAC addresses) in its memory system, and comparing the checksum retrieved from the BIOS ROM 210 to the checksum retrieved for the data ROM 216 to determine whether they match. As will be appreciated by one of skill in the art in possession of the present disclosure, matching checksums retrieved from the BIOS ROM 210 and the data ROM 216 are indicative of matching MAC addresses in the BIOS ROM 210 and the data ROM 216, while unmatching checksums retrieved from the BIOS ROM 210 and the data ROM 216 are indicative of different MAC addresses in the BIOS ROM 210 and the data ROM 216 (e.g., the unmatching default MAC addresses 400 in the BIOS ROM 210 and customized MAC addresses 504 in the data ROM 216 in this example).

If at decision block 312, it is determined that the MAC addresses in the secondary BIOS storage system match the default MAC addresses in the primary storage system, the method 300 proceeds to block 314 where the BIOS backup/recovery subsystem completes the initialization operations. With reference back to the embodiment of FIGS. 8A and 8B in which the NAC region 212 of the BIOS ROM 210 in the BIOS 208 provided in the primary BIOS storage system 206 includes the default MAC addresses 400 discussed above and the data ROM 216 included in the secondary BIOS storage system 214 includes the default MAC addresses 400 as well, in an embodiment of block 314 and following the determination that the BIOS ROM 210 and the data ROM 216 both store the default MAC addresses 400, the BIOS backup/recovery engine 204 in the computing device 200 may perform initialization completion operations that include completing POST and/or other initialization operations that would be apparent to one of skill in the art in possession of the present disclosure. As such, in the event the BIOS ROM 210 and the data ROM 216 both store the same default MAC addresses, initialization operations may be completed without modifying the MAC addresses included in either of the BIOS ROM 210 and the data ROM 216.

If at decision block 312, it is determined that the MAC addresses in the secondary BIOS storage system do not match the default MAC addresses in the primary storage system, the method 300 proceeds to block 316 where the BIOS backup/recovery subsystem performs a BIOS recovery operation that includes copying the customized MAC addresses in the secondary BIOS storage system to the primary BIOS storage system. With reference back to the embodiment of FIGS. 9A, 9B, and 9C in which the NAC region 212 of the BIOS ROM 210 in the BIOS 208 provided in the primary BIOS storage system 206 includes the default MAC addresses 400 discussed above and the data ROM 216 in the secondary BIOS storage system 214 includes the customized MAC addresses 504 discussed above, in an embodiment of block 316 and following the determination that customized MAC addresses 504 stored the data ROM 216 do not match the default MAC addresses 400 stored in the BIOS ROM 210, the BIOS backup/recovery engine 204 in the computing device 200 may perform BIOS recovery operations 904 that include copying the customized MAC addresses 504 stored in the data ROM 216 to the BIOS ROM 210 (e.g., overwriting the default MAC addresses 400 in the BIOS ROM 210 with the customized MAC addresses 504). As will be appreciated by one of skill in the art in possession of the present disclosure, the customized MAC addresses 504 copied to the BIOS ROM 210 at block 316 by the BIOS backup/recovery engine 204 may be the customized MAC addresses that were retrieved as part of the secondary BIOS storage system/primary BIOS storage system MAC address matching determination operations 902 discussed above and stored in its memory system (as illustrated in FIG. 9C), or may be retrieved from the data ROM 216 at block 316 in order to perform that copying. In a specific example, the customized MAC addresses 504 may be copied to the BIOS ROM 210 at block 316 by copying the PFA data retrieved from the data ROM 216 to the BIOS ROM 210.

Following block 316, the method 300 proceeds to block 314 where the BIOS backup/recovery subsystem completes the initialization operations similarly as discussed above. In an embodiment, at block 314 and following the BIOS recovery operations 904, the BIOS backup/recovery engine 204 in the computing device 200 may perform initialization completion operations that include completing POST and/or other initialization operations that would be apparent to one of skill in the art in possession of the present disclosure. As such, in the event the BIOS ROM 210 stores default MAC addresses and the data ROM 216 stores customized MAC addresses (e.g., MAC addresses that are valid for the purposes of DHCP operations), initialization operations may be completed after restoring the customized MAC addresses from the data ROM 216 in the BIOS ROM 210. As such, following the restoration of the BIOS 208 in the computing device 200 (e.g., following the corruption of the BIOS 208, the erasing of the primary BIOS storage system 206 and/or BIOS ROM 210, and the rewriting of the BIOS 208 in the primary BIOS storage system 206 including the default MAC addresses in the NAC region 212 of the BIOS ROM 210), customized/valid MAC addresses that were previously backed up in the data ROM 216 may be restored in the BIOS ROM 210 (e.g., by overwriting the default MAC addresses with the customized MAC addresses).

Thus, systems and methods have been described that provide for the backing up and recovery of customized MAC addresses utilized by a BIOS in a computing device. For example, the BIOS backup/recovery system of the present disclosure may include a chassis housing a BIOS backup/recovery subsystem coupled to a primary and a secondary BIOS storage system. The BIOS backup/recovery subsystem begins initialization operations and determines whether the primary BIOS storage system includes customized MAC addresses. If so, the BIOS backup/recovery subsystem determines whether MAC addresses in the secondary BIOS storage system match the customized MAC addresses in the primary BIOS storage system and, if not, performs a BIOS backup operation that includes copying the customized MAC addresses in the primary BIOS storage system to the secondary BIOS storage system. If not, the BIOS backup/recovery subsystem determines whether MAC addresses in the secondary BIOS storage system match default MAC addresses in the primary BIOS storage system and, if not, performs a BIOS recovery operation that includes copying customized MAC addresses in the secondary BIOS storage system to the primary BIOS storage system. As such, a corrupted BIOS in a computing device may be recovered and provided with the customized MAC addresses it was utilizing prior to the corruption, thus ensuring the computing device operates properly without following the BIOS recovery without the need for intervention from a user.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Basic Input/Output System (BIOS) backup/recovery system, comprising:
    a chassis;
    a primary Basic Input/Output System (BIOS) storage system housed in the chassis;
    a secondary BIOS storage system housed in the chassis; and
    a BIOS backup/recovery subsystem that is housed in the chassis, coupled to the primary BIOS storage system and the secondary BIOS storage system, and configured to:
    begin initialization operations;
    determine whether the primary BIOS storage system includes customized Media Access Control (MAC) addresses; and
    in response to determining that the primary BIOS storage system includes customized MAC addresses, determine whether MAC addresses included in the secondary BIOS storage system match the customized MAC addresses included in the primary BIOS storage system and, if not, perform a BIOS backup operation that includes copying the customized MAC addresses included in the primary BIOS storage system to the secondary BIOS storage system; and
    in response to determining that the primary BIOS storage system does not include customized MAC addresses, determine whether MAC addresses included in the secondary BIOS storage system match default MAC addresses included in the primary BIOS storage system and, if not, perform a BIOS recovery operation that includes copying customized MAC addresses included in the secondary BIOS storage system to the primary BIOS storage system.

2. The system of claim 1, wherein the BIOS backup/recovery subsystem is configured to:
    complete, in response to determining that the MAC addresses included in the secondary BIOS storage system match the customized MAC addresses included in the primary BIOS storage system, the initialization operations without modifying the customized MAC addresses included in the primary BIOS storage system and the secondary BIOS storage system.

3. The system of claim 1, wherein the BIOS backup/recovery subsystem is configured to:
    complete, in response to determining that the MAC addresses included in the secondary BIOS storage system match the default MAC addresses included in the primary BIOS storage system, the initialization operations without modifying the default MAC addresses included in the primary BIOS storage system and the secondary BIOS storage system.

4. The system of claim 1, wherein the primary BIOS storage system is provided by a primary Serial Peripheral Interface (SPI) chip and the MAC addresses are included in the primary SPI chip in a BIOS Read-Only Memory (ROM), and wherein the secondary BIOS storage system is provided by a secondary SPI chip and the MAC addresses are included in the secondary SPI chip in a data ROM.

5. The system of claim 1, wherein the determining whether the MAC addresses included in the secondary BIOS storage system match the customized MAC addresses included in the primary BIOS storage system includes determining whether a MAC address checksum associated with the MAC addresses included in the secondary BIOS storage system matches a customized MAC address checksum associated with the customized MAC addresses included in the primary BIOS storage system.

6. The system of claim 1, wherein the determining whether the MAC addresses included in the secondary BIOS storage system match the default MAC addresses included in the primary BIOS storage system includes determining whether a MAC address checksum associated with the MAC addresses included in the secondary BIOS storage system matches a default MAC address checksum associated with the default MAC addresses included in the primary BIOS storage system.

7. An Information Handling System (IHS), comprising:
    a processing system; and
    a memory system that is coupled to the processing system and that includes instructions that, when executed by the processing system, cause the processing system to provide a Basic Input/Output System (BIOS) backup/recovery engine that is configured to:
    begin initialization operations;
    determine whether a primary BIOS storage system includes customized Media Access Control (MAC) addresses; and
    in response to determining that the primary BIOS storage system includes customized MAC addresses, determine whether MAC addresses included in a secondary BIOS storage system match the customized MAC addresses included in the primary BIOS storage system and, if not, perform a BIOS backup operation that includes copying the customized MAC addresses included in the primary BIOS storage system to the secondary BIOS storage system; and in response to determining that the primary BIOS storage system does not include customized MAC addresses, determine whether MAC addresses included in a secondary BIOS storage system match default MAC addresses included in the primary BIOS storage system and, if not, perform a BIOS recovery operation that includes copying customized MAC addresses included in the secondary BIOS storage system to the primary BIOS storage system.

8. The IHS of claim 7, wherein the BIOS backup/recovery engine is configured to:

complete, in response to determining that the MAC addresses included in the secondary BIOS storage system match the customized MAC addresses included in the primary BIOS storage system, the initialization operations without modifying the customized MAC addresses included in the primary BIOS storage system and the secondary BIOS storage system.

9. The IHS of claim 7, wherein the BIOS backup/recovery engine is configured to:

complete, in response to determining that the MAC addresses included in the secondary BIOS storage system match the default MAC addresses included in the primary BIOS storage system, the initialization operations without modifying the default MAC addresses included in the primary BIOS storage system and the secondary BIOS storage system.

10. The IHS of claim 7, wherein the primary BIOS storage system is provided by a primary Serial Peripheral Interface (SPI) chip and the MAC addresses are included in the primary SPI chip in a BIOS Read-Only Memory (ROM), and wherein the secondary BIOS storage system is provided by a secondary SPI chip and the MAC addresses are included in the secondary SPI chip in a data ROM.

11. The IHS of claim 7, wherein the determining whether the MAC addresses included in the secondary BIOS storage system match the customized MAC addresses included in the primary BIOS storage system includes determining whether a MAC address checksum associated with the MAC addresses included in the secondary BIOS storage system matches a customized MAC address checksum associated with the customized MAC addresses included in the primary BIOS storage system.

12. The IHS of claim 7, wherein the determining whether the MAC addresses included in the secondary BIOS storage system match the default MAC addresses included in the primary BIOS storage system includes determining whether a MAC address checksum associated with the MAC addresses included in the secondary BIOS storage system matches a default MAC address checksum associated with the default MAC addresses included in the primary BIOS storage system.

13. The IHS of claim 7, wherein processing system includes a Central Processing Unit (CPU) and a Serial Peripheral Interface (SPI) controller.

14. A method for backing up and recovering a Basic Input/Output System (BIOS) in a computing device, comprising:

beginning, by a Basic Input/Output System (BIOS) backup/recovery subsystem, initialization operations;

determining, by the BIOS backup/recovery subsystem, whether a primary BIOS storage system includes customized Media Access Control (MAC) addresses; and in response to determining that the primary BIOS storage system includes customized MAC addresses, determining, by the BIOS backup/recovery subsystem, whether MAC addresses included in a secondary BIOS storage system match the customized MAC addresses included in the primary BIOS storage system and, if not, performing a BIOS backup operation that includes copying the customized MAC addresses included in the primary BIOS storage system to the secondary BIOS storage system; and in response to determining that the primary BIOS storage system does not include customized MAC addresses, determining, by the BIOS backup/recovery subsystem, whether MAC addresses included in a secondary BIOS storage system match default MAC addresses included in the primary BIOS storage system and, if not, performing a BIOS recovery operation that includes copying customized MAC addresses included in the secondary BIOS storage system to the primary BIOS storage system.

15. The method of claim 14, further comprising:

complete, by the BIOS backup/recovery subsystem in response to determining that the MAC addresses included in the secondary BIOS storage system match the customized MAC addresses included in the primary BIOS storage system, the initialization operations without modifying the customized MAC addresses included in the primary BIOS storage system and the secondary BIOS storage system.

16. The method of claim 14, further comprising:

completing, by the BIOS backup/recovery subsystem in response to determining that the MAC addresses included in the secondary BIOS storage system match the default MAC addresses included in the primary BIOS storage system, the initialization operations without modifying the default MAC addresses included in the primary BIOS storage system and the secondary BIOS storage system.

17. The method of claim 14, wherein the primary BIOS storage system is provided by a primary Serial Peripheral Interface (SPI) chip and the MAC addresses are included in the primary SPI chip in a BIOS Read-Only Memory (ROM), and wherein the secondary BIOS storage system is provided by a secondary SPI chip and the MAC addresses are included in the secondary SPI chip in a data ROM.

18. The method of claim 14, wherein the determining whether the MAC addresses included in the secondary BIOS storage system match the customized MAC addresses included in the primary BIOS storage system includes determining whether a MAC address checksum associated with the MAC addresses included in the secondary BIOS storage system matches a customized MAC address checksum associated with the customized MAC addresses included in the primary BIOS storage system.

19. The method of claim 14, wherein the determining whether the MAC addresses included in the secondary BIOS storage system match the default MAC addresses included in the primary BIOS storage system includes determining whether a MAC address checksum associated with the MAC addresses included in the secondary BIOS storage system matches a default MAC address checksum associated with the default MAC addresses included in the primary BIOS storage system.

20. The method of claim 14, wherein the BIOS backup/recovery subsystem is provided by a Central Processing Unit (CPU) and a Serial Peripheral Interface (SPI) controller.

* * * * *